Feb. 8, 1966  A. W. KUTCHERA  3,233,532
PHOTOGRAPHIC APPARATUS
Filed April 25, 1962  14 Sheets-Sheet 1

FIG. I

INVENTOR.
ARTHUR W. KUTCHERA
BY
Carpenter Abbott Coulter and Kinney
ATTORNEYS

Feb. 8, 1966   A. W. KUTCHERA   3,233,532
PHOTOGRAPHIC APPARATUS
Filed April 25, 1962   14 Sheets-Sheet 5

INVENTOR.
ARTHUR W. KUTCHERA
BY
Carpenter Abbott Coulter and Kinney
ATTORNEYS

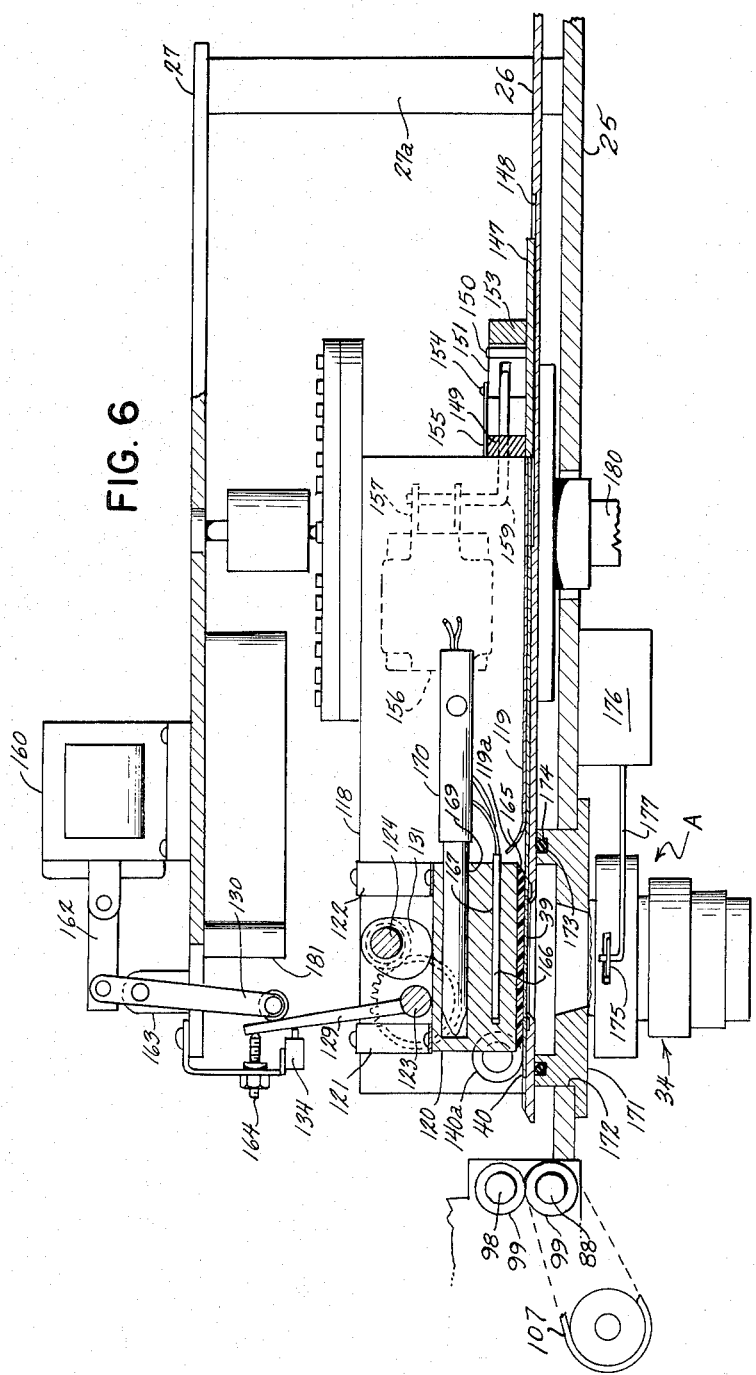

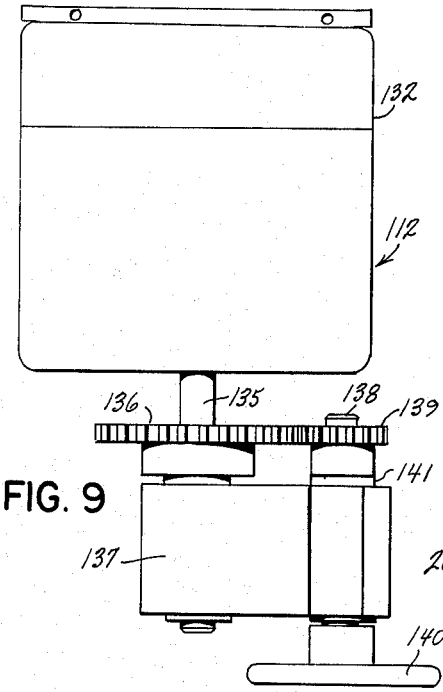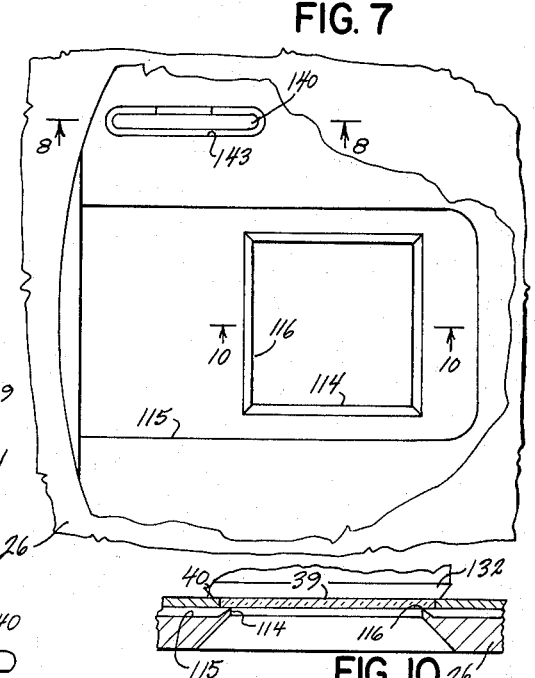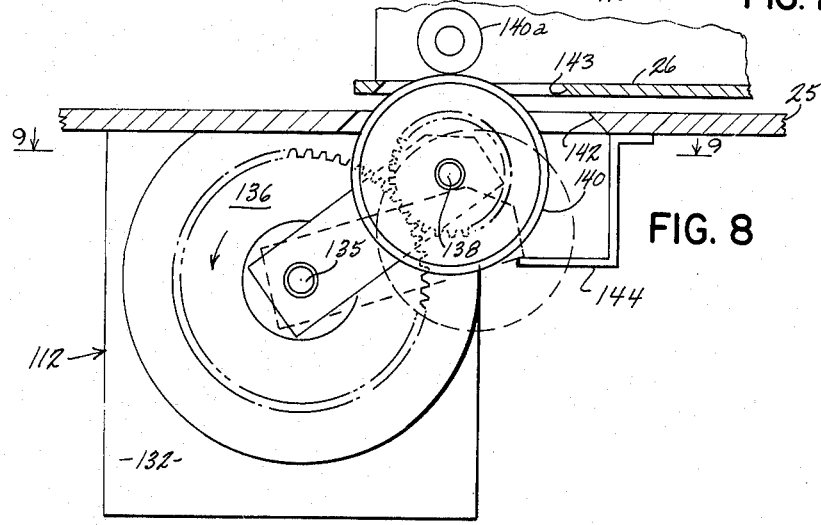

Feb. 8, 1966    A. W. KUTCHERA    3,233,532
PHOTOGRAPHIC APPARATUS
Filed April 25, 1962    14 Sheets-Sheet 8

INVENTOR.
ARTHUR W. KUTCHERA
BY
Carpenter, Abbott, Coulter & Kinney
ATTORNEYS

Feb. 8, 1966  A. W. KUTCHERA  3,233,532
PHOTOGRAPHIC APPARATUS
Filed April 25, 1962  14 Sheets-Sheet 9

INVENTOR.
ARTHUR W. KUTCHERA
BY
Carpenter Abbott Coulter and Kinney
ATTORNEYS

INVENTOR.
ARTHUR W. KUTCHERA
BY
Carpenter, Abbott, Coulter and Kinney
ATTORNEYS

Feb. 8, 1966   A. W. KUTCHERA   3,233,532
PHOTOGRAPHIC APPARATUS

Filed April 25, 1962   14 Sheets-Sheet 14

INVENTOR.
ARTHUR W. KUTCHERA
BY
Carpenter, Abbott, Coulter and Kinney
ATTORNEYS

United States Patent Office 3,233,532
Patented Feb. 8, 1966

3,233,532
PHOTOGRAPHIC APPARATUS
Arthur W. Kutchera, White Bear Lake, Minn., assignor to Minnesota Mining and Manufacturing Company, St. Paul, Minn., a corporation of Delaware
Filed Apr. 25, 1962, Ser. No. 190,062
7 Claims. (Cl. 95—14)

This invention relates to an apparatus for exposing, processing and drying photosensitive film sections while the same are in the form of inserts mounted in the apertures of aperture cards of the record type commonly employed in known and existing record card tabulating and sorting systems.

The use of image-bearing frames of microfilm mounted as inserts in apertures of record cards has gained wide acceptance as a means of storing and recording information. However, prior machines and methods of preparing such cards have been restrictive from the standpoint of time as well as from the standpoint of the facilities and equipment required. According to prior practice the indicia-bearing documents to be reproduced on the film section were photographed by a suitable camera, then when the film strip for the camera was completely exposed, the film was developed. This strip of film was then cut into individual frames and the inserts were mounted in prepared record or tabulating cards adapted to receive the frame sections. This process is laborious and time consuming and is not economical since several separate machines are necessary for the operation. Further, a darkroom is required for the processing of the exposed photosensitive film strip.

The principal object of the present invention is to provide an apparatus for the rapid production of an aperture card bearing a photographic negative reproduction of any document by the utilization of aperture cards each having an unexposed photosensitive film section mounted in unitized form in the aperture thereof, and by carrying out exposure, processing and drying operations on the film section while the remainder of the unitized card assemblage, i.e., the aperture card, is masked to prevent subjection thereof to said operations.

A further object of the present invention is to provide an improved apparatus which can accomplish the aforementioned exposure, developing and drying operations on, for example, a silver halide film section mounted in apertured paper card stock without damaging said card stock and without the use of a darkroom.

A further object of the invention is to provide an apparatus of the aforementioned character which is automatic in operation and by means of which an unskilled operator can, at a high rate of speed, reproduce documents in the form of microfilm negatives mounted in aperture cards.

A further object of the present invention is to provide an apparatus as aforedescribed having embodied therein a novel storage magazine and card feeding mechanism.

A further object of the present invention is to provide an improved apparatus of the class described embodying a novel photographic film processing system wherein developer, fix and wash solutions are sequentially sprayed against a preheated, exposed film section in a homogeneous state and not mixed with air as is common with existing film processing systems.

These and other objects of the present invention will become more apparent as the following description proceeds, and the accompanying drawings are referred to, in which:

FIGURE 6 is a fragmentary vertical sectional view taken approximately on line 6—6 of FIGURE 5;

FIGURE 7 is an enlarged fragmentary plan view of one area of the card-supporting table;

FIGURE 8 is a vertical sectional view taken along line 8—8 of FIGURE 7;

FIGURE 9 is a plan view taken along line 9—9 of FIGURE 8;

FIGURE 10 is a vertical section taken along the line 10—10 of FIGURE 7;

Figure 1:
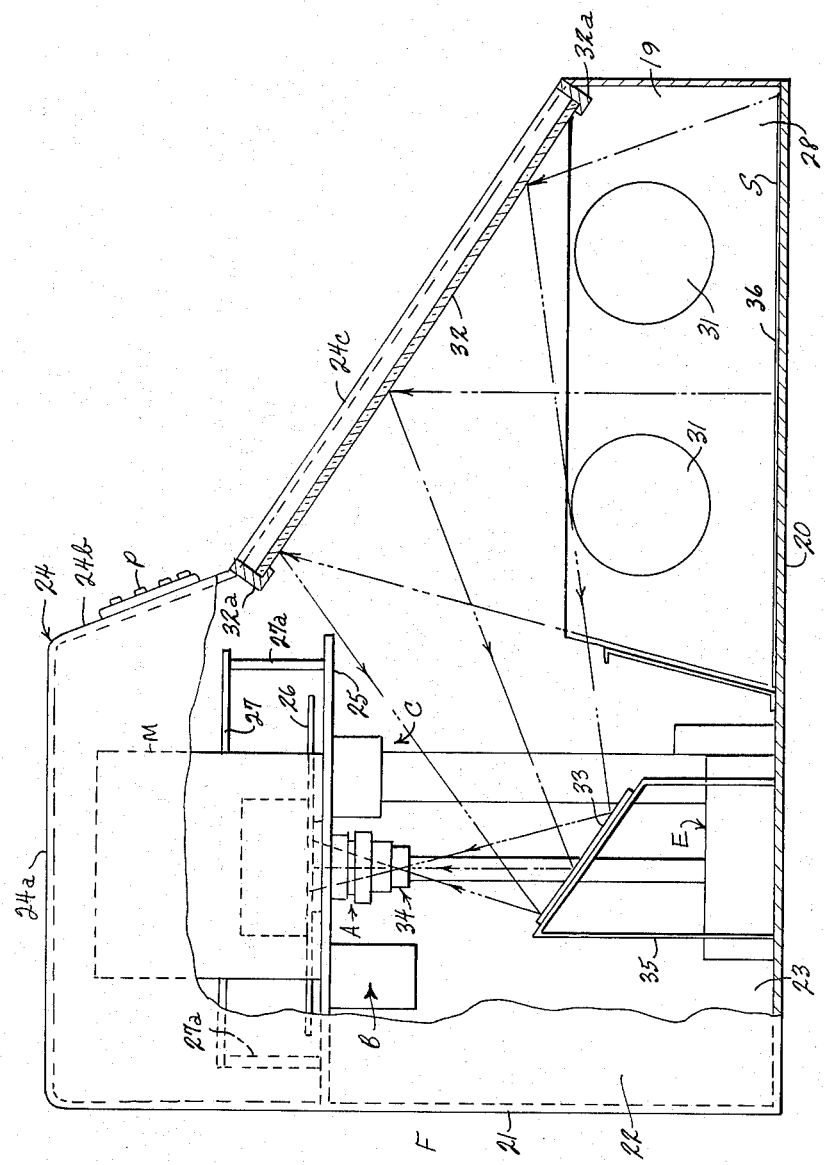
FIGURE 1 is a semi-diagrammatic end elevational view of an apparatus constructed in accordance with the present invention.

Referring now to the drawing, there is shown therein one form of apparatus constructed in accordance with the present invention. This apparatus is adapted to photograph individual documents on photosensitive film inserts mounted in aperture cards and to rapidly process said film inserts to provide a photographic negative. Such apparatus will be more readily understood upon consideration of FIGURES 1 and 2. The apparatus includes a control panel P, a stage S upon which the document is placed, said stage being partially enclosed by the frame structure F of the apparatus. The apparatus further includes a storage magazine M for aperture cards carrying unexposed photographic film sections, means defining a film exposure station A, means defining a developing station B, means defining a film drying station C, and a container D for receiving the cards after the film sections have been developed and dried. The apparatus also includes a card masking and conveying table 26 to which a card is clamped and by which said card is conveyed through said stations in sequence. Drive means E is provided for the table 26.

The film for use in this machine may take the form of inserts or segments of light sensitive silver halide film mounted in aperture cards of the record type commonly employed in connection with existing record card tabulating and sorting systems. It will be understood, however, that the invention is not limited to the printing and developing of film sections mounted in cards of the statistical or tabulating machine type, since other forms of apertured record or catalogue cards may be used.

Figure 2:
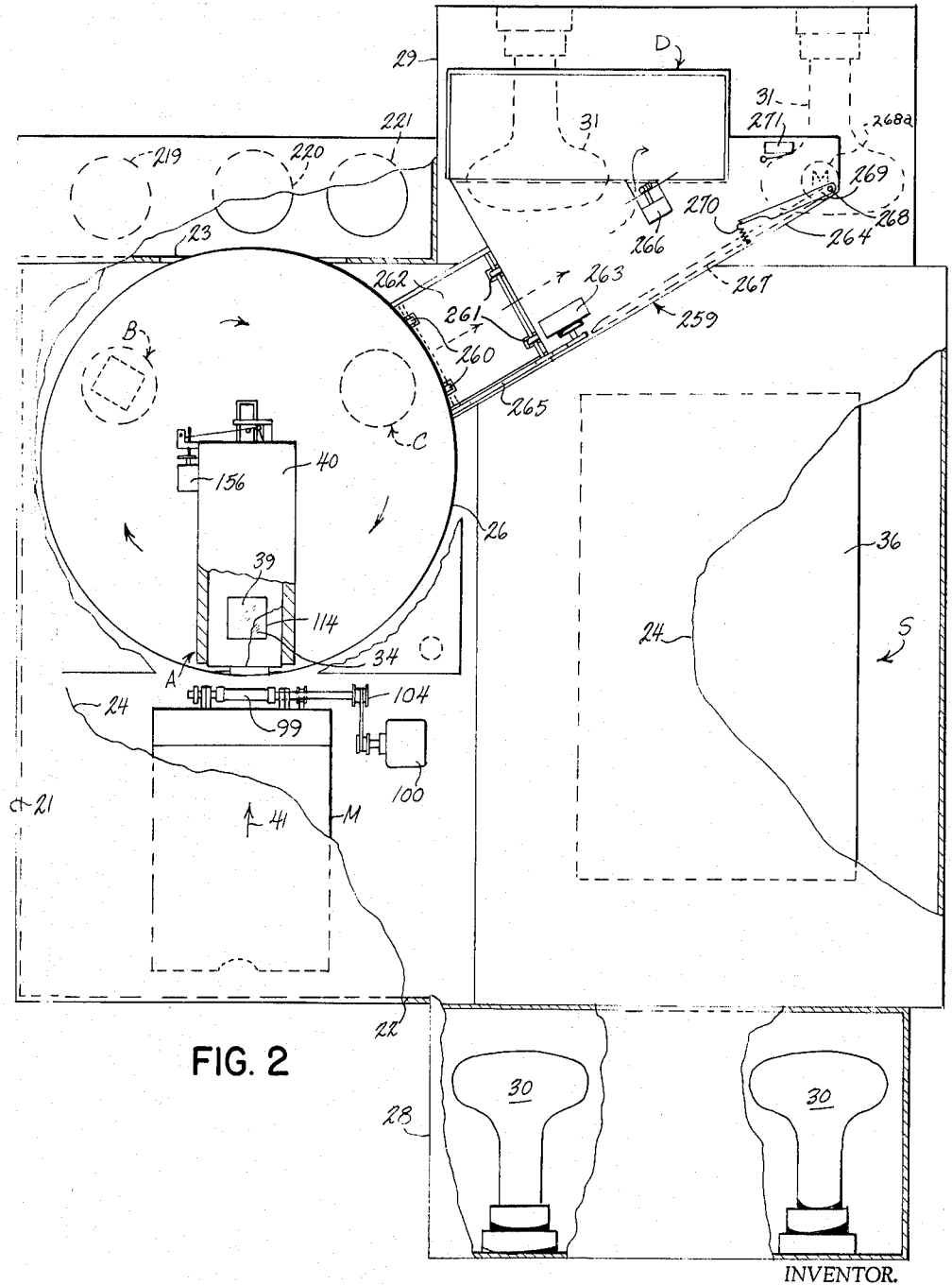
FIGURE 2 is a semi-diagrammatic plan view of the apparatus of FIGURE 1.

As illustrated in FIGURES 1 and 2, the various mechanisms of the machine are enclosed in an enclosure F comprising a base plate or platform 20, a rear panel 21, side panels 22 and 23, and a cover panel 24. The cover panel 24 has a horizontal portion 24a and inclined portions 24b and 24c. The front of the enclosure F is provided with a front opening 19. Additional box-like enclosures 28 and 29 are secured to the side panels 22 and 23, respectively, and house a plurality of lamps 30 and 31, respectively, for illuminating the stage S. A rectangular support plate 25 is positioned in the upper portion of the enclosure F and extends parallel to the platform 20.

The plate 25 supports the magazine assembly M on the upper side thereof, and supports the exposure station A, the developing station B and drying station C on the under side thereof as will be described in greater detail as this description proceeds. The turn table or film supporting and masking plate 26 is supported immediately above the plate 25. A plurality of legs 27a extending upwardly from the plate 25 fixedly support a second rectangular plate 27 above the turn table 26.

By reference to FIGURE 1, it will be noted that a relatively large mirror 32 is supported by brackets 32a above the stage S and is inclined with respect to said stage. A second inclined mirror 33 is fixedly supported by a frame 35 above the platform 20 and rearwardly of the stage S. The mirrors 32 and 33 serve as light path bending means to direct light from the stage S into a lens and shutter component 34 of the exposure station A. The opening 19 in the front of the enclosure F allows the insertion of a document or drawing 36 onto the stage S as shown in FIGURES 1 and 2. The lamps 30 and 31 illuminate the stage S and the document 36 thereon, the image of said document being reflected by the mirrors 32 and 33 to the lens element 34 as indicated by dot and dash lines in FIGURE 1.

Referring to FIGURE 2, the table 26 is formed with a rectangular opening 114, and there is means (to be described later) provided to feed an aperture card 40 from the magazine M onto the table 26 in position such that the aperture of said card is in registry with the opening 114. At the time the card 40 is thus fed, the table 26 is oriented such that the opening 114, and thereby also the photosensitive film insert 39 mounted in the aperture of said card, is disposed at the exposure station A over the lens and shutter component 34. After the film section 39 of the card 40 has been exposed, the table 26 is rotated clockwise (by means to be described later) conveying the card 40 to the processing station B where the table stops to permit processing of the exposed film section thereat. Upon completion of the processing, table 26 is then rotated further to convey the card 40 to the drying station D at which the film section 39 thereof is dried. At the drying station D there is means for discharging the card 40 from the table 26 into the receiving container D, and upon discharge of said card the table 26 is again rotated clockwise to return it to its initial position wherein the opening 114 is disposed at the exposure station A. A new card 40 is then fed from the magazine M onto the table 26 in preparation for a succeeding cycle.

Figure 3:
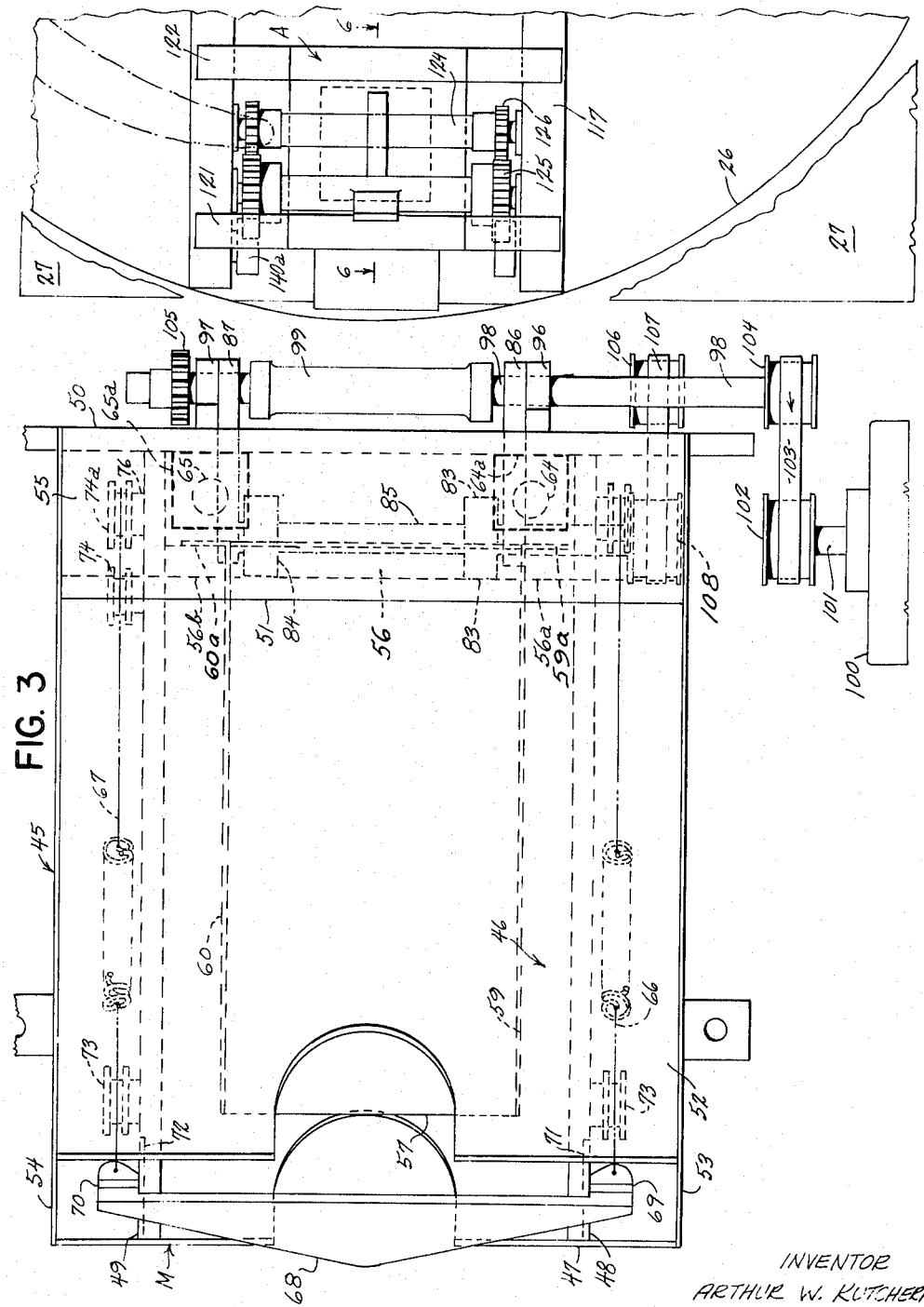
FIGURE 3 is a fragmentary plan view showing the magazine assembly.
Figure 4:
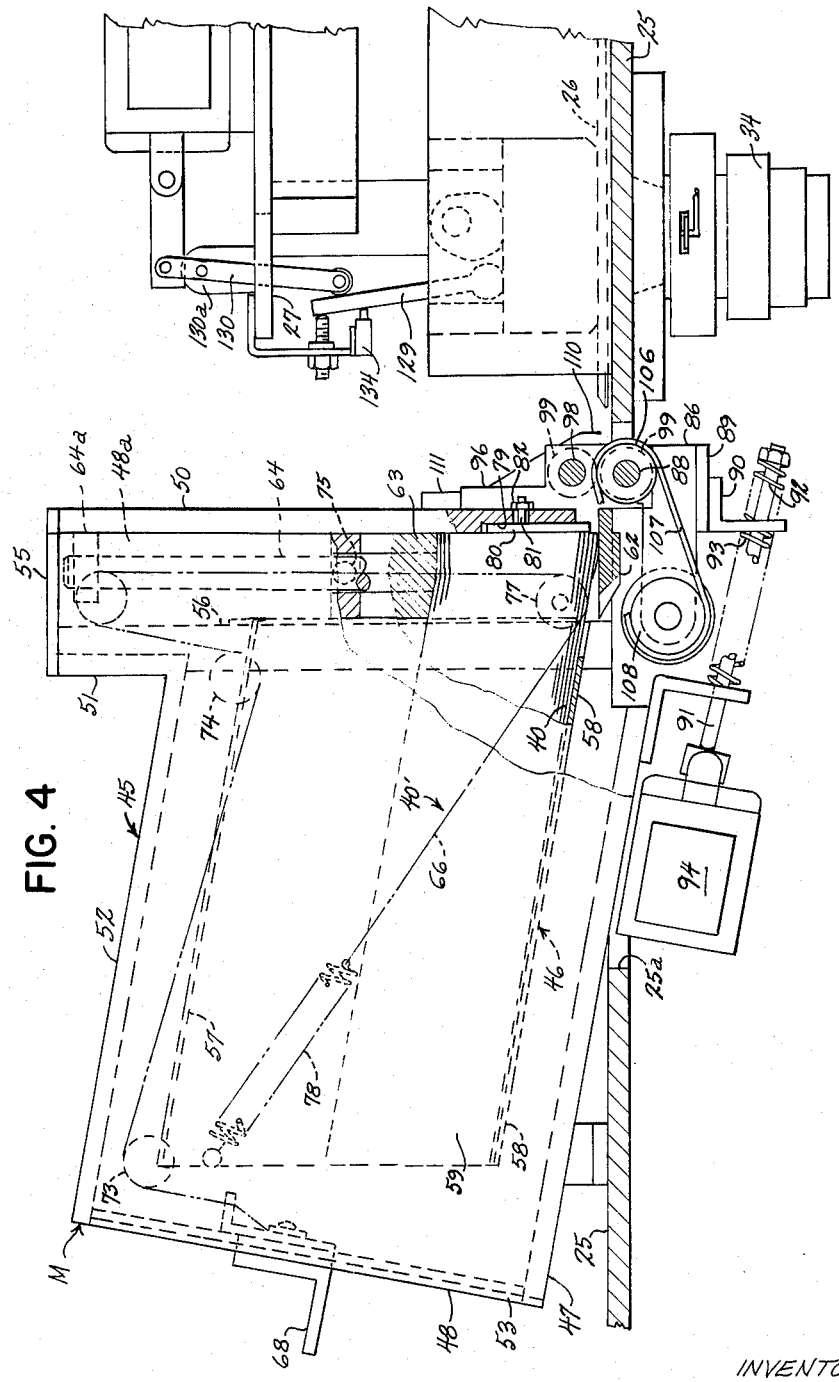
FIGURE 4 is a fragmentary elevational view of the magazine assembly.

Referring now to FIGURES 3 and 4, the card magazine M is mounted on the support plate 25 with a portion thereof fitted through an opening 25a formed in said plate. The magazine M comprises an outer frame structure 45 and an inner card supporting frame 46. The outer frame 45 includes an inclined bottom plate 47 which has secured thereto a pair of vertical inwardly set spaced parallel plates 48 and 49. The plates 48 and 49 have upward projections 48a and 49a, at the forward end thereof, and the outer frame 45 also includes a front plate 50. A top plate 55 and a rear plate 51 form a box-like enclosure with projections 48a and 49a and front plate 50. The plates 47, 50, 51, 52 and 55 extend transversely outwardly beyond the plates 48 and 49 and are joined to a pair of vertical side plates 53 and 54 to complete the outer frame structure 45.

Within the frame 45 an inverted U-shaped member 56 has leg portions 56a and 56b affixed to and overlaying the inner surfaces of the plates 48 and 49, the bight portion of said member being secured to the rear plate 51 within the box-like enclosure aforementioned.

The inner frame 46 is adapted to store therein a supply of aperture cards 40 bearing unexposed light sensitive film sections 39. The frame 46 takes the form of an open-ended rectangular tubular member comprising a top plate 57, a bottom plate 58 and side plates 59 and 60. The side plates 59 and 60 have transversely outwardly oppositely bent flanges 59a and 60a, respectively, at their forward ends, said flanges being secured by any suitable fastening means to the aforementioned legs 56a and 56b, respectively. The inner frame 46 is inclined as best shown in FIGURE 4 for a purpose which will appear hereinafter, and when a supply of cards is inserted thereinto, said cards are moved forwardly therein until they abut the front wall or plate 50. A small supply of card 40′ is shown stored in the frame 46 in FIGURE 4. The cards are preferably supplied in a suitable light tight carton (not shown) which is so constructed that upon insertion of the cards into said container 46 the carton closes the outer end of the frame 46. Alternatively, the frame 46 could be provided with a light tight removable end plate (not shown) at the rear end thereof.

A transverse plate 62 having a highly polished upper surface is secured to the bottom portion of the plates 48 and 49 at the forward end thereof and is positioned horizontally in front of the card supporting frame 46. This plate, positioned as shown in FIGURE 4, causes the leading end of the card to be transversely crimped or bent slightly across said end in a manner to insure that the forward edge thereof is lying flat on the plate 62. The slight bend placed in the inclined card flattens the leading edge even on cards which are normally warped. As an aid to placing this slight transverse bend in the cards, a weight 63 is positioned vertically above the plate 62. The weight 63 is formed with vertically extending slots in the end portions thereof through which extend vertically disposed rods 64 and 65. The rods 64 and 65 serve as guides and allow the weight to move vertically within the frame 46. The rods 64 and 65 are retained in position by blocks 64a and 65a at the upper ends thereof and by bores formed in the plate 62 or by other means (not shown) at their lower ends.

The weight 63 is movable vertically on the rods 64 and 65 by a pair of small cables 66 and 67. The cables 66 and 67 are secured to opposite ends of a handle 68, slidable vertically on the rear end portions of plates 48 and 49. The handle 68 is formed with end portions 69 and 70 having inwardly facing projections riding in grooves 71 and 72 formed in said plates. The cables 66 and 67 extend from the handle 68 upward around pulleys 73, pulleys 74 and pulleys 74a rotatably mounted on the plates 48 and 49, and down to outwardly extending pins 75 and 76 fixed to opposite transverse ends of the weight 63. The pins 75 and 76 project through vertically extending slotted openings in the plates 48 and 49 and have set screws therein which bind the cables passing downwardly through said pins thus fixing the cables thereto. The cables 66 and 67 then pass around pulleys 77, rotatably mounted on the lower forward portions of the plates 48 and 49, and are connected at their ends to one end of a set of tension springs 78. The tension springs 78 are fixed at their opposite ends to the plates 48 and 49 and serve to urge the weight downward when the frame 46 is filled with a supply of cards 40, thus aiding to insure that the desired pressure is applied to the lowermost card in the stack 40′ as shown in FIGURE 4.

The forward plate 50 is formed with a pair of grooves 79, one of which is shown in FIGURE 4, which have fitted therein a pair of stop members 80. The stop members 80 have threaded pins 81 fixed thereto which extend through enlarged openings in the plate 50 and a lock nut 82 is threaded thereon to retain said stop members in the desired vertical position. The lower portion of the members 80 are formed with sharp edges and are spaced above the transverse plate 62 an amount to allow only a single card to be fed therebetween at one time. The clearance, for example, between the stop members 80 and the plate 62 may be on the order of .010–.012 inch to allow only one card, having a thickness of around .007 inch, to be fed forwardly at a time.

The feeding mechanism for the magazine M comprises a primary driving means including a pair of rollers 83 and 84, which may also take the form of a single cylindrical roll, having a covering on the outer periphery of material of high frictional value such as rubber. These rollers 83 and 84 are secured to a rotatable transverse shaft 85 suitably bearinged in one end of a pair of L-shaped plates 86 and 27. The plates 86 and 87 are swingably mounted at their opposite ends on a transverse shaft 88. A transverse plate 89 is fixed by suitable means such as weldments to the under side of the plates 86 and 87 causing the same to swing in unison. An angle bar 90 is secured to the plate 89 and is provided with a central opening in the depending flange thereof to receive one end of a rod 91 therethrough. The rod 91 carries a pair of helical springs 92 and 93 positioned on either side of said bar 90, and is pivotally connected at the opposite end to an armature of a card feed solenoid 94. The solenoid 94 is fixedly mounted to the bottom plate 47 of the magazine M and energization and de-energization thereof imparts reciprocatory movement to the link 91 to swing the plates 86 and 87 about the shaft 88 to raise and lower the rollers 83 and 84. In the raised position the rollers 83 and 84 engage the lowermost card 40 in the magazine driving it forwardly along the upper surface of the plate 62 beneath the stop 80. The plate 62 and the plate 58 are formed with slots permitting the aforementioned upward swinging movement of the rollers 83 and 84 such that they may engage the lowermost card.

The shaft 88 is bearinged along the extent thereof in a pair of upright brackets 96 and 97 fixed to the forward side of the plate 50 on each side of an opening therein through which the card passes. The brackets 96 and 97 also journal a shaft 98 positioned above and in vertically aligned relation with respect to the shaft 88. The shafts 88 and 98 carry secondary cylindrical feed rollers 99 (only the roller 99 on shaft 98 is clearly shown in FIGURE 3) formed of molded friction material such as rubber, which have enlarged card engaging end portions. The rollers 99 serve to draw a card out of the magazine after it is fed forwardly by the main feed rollers 83 and 84.

The several rollers 83, 84 and 99 are driven from a motor 100 mounted on the support plate 25. The motor may be provided with a suitable reduction gear train and a driven shaft 101 extends therefrom upon which is secured a drive pulley 102. A belt 103 entrained around the pulley 102 drives a second timing pulley 104 fixed to the shaft 98. The shaft 98 and the shaft 88 have intermeshing gears 105 fixed on one end thereof to simultaneously drive the shaft 88 from the driven shaft 98. Shaft 88 has a pulley 106 secured thereto and a second belt 107 entrained thereon drives a timing pulley 108 fixed to the shaft 85.

This driving mechanism will feed a card 40 from the magazine when the primary feed rollers 83 and 84 are raised upward by the solenoid 94 into engagement with the lowermost card. As the card is fed to the right, as viewed in FIGURE 4, the rollers 99 will pick up the card and feed it therebetween. As the card is fed between the rollers 99, the end of said card will strike an arm 110 which extends downwardly over the rollers 99 from a micro-switch 111. This micro-switch 111 controls the electrical circuit to the selenoid 94 in a manner described in conjunction with the description of the electrical circuitry.

As the card 40 is fed from the magazine M as above described, it is directed onto the card masking and conveying table 26. A card feeding means generally designated 112 is mounted on the support plate 25 and serves to feed the card onto said table in position after being fed part way by the secondary card feed rollers 99. The card feeding means 112 will be more fully described with reference to FIGURES 7, 8 and 9 hereinafter.

As best illustrated in FIGURES 5, 6, 7 and 10, the card masking and conveying plate or turn table 26 includes means for receiving and positioning the card thereon such that the insert portion 39 thereof is positioned in registry with the opening 114 formed in said table. The opening 114 is formed in the plate 26 and is framed by a recessed surface 115 formed in the upper surface of the table 26. The opening 114 most clearly shown in FIGURES 7 and 10 is bounded by four knife-like edges 116. The edges 116 are formed by beveling the under surface of the plate 26 adjacent the opening and said edges define an opening having dimensions slightly less than the corresponding dimensions of the film portion 39 of the card 40.

The card receiving and positioning means comprise a pair of upstanding parallel spaced plate members 117 and 118. The plates 117 and 118 are spaced apart a distance substantially equal to the width of the cards and are positioned with respect to the opening 114 such that when a card 40 is positioned horizontally therebetween, the film section 39 of said card is aligned and in registry with said opening. A thin deflector plate 119, having an upturned end portion 119a is secured to the plates 117 and 118 above the position assumed by the card. This plate 119 ensures that the card lies flat on the table 26.

A card clamping block or platen 120 is positioned above the opening 114 in the table 26 and is mounted for movement toward and away from said table. The platen 120 acts to clamp the film section of the card 40 against the edges 116 of the opening 114 to mask the card stock during processing thus preventing any damage thereto. The platen 120 is mounted on a pair of U-shaped spring members 121 and 122, secured at their ends to the upper edges of the plates 117 and 118. The bight portion of the springs 121 and 122 is secured to the upper surface of the platen 120 to hold the platen in a normally raised position above the table 26.

Positioned above the platen 120 and bearinged at their ends in the plates 117 and 118 are a pair of shafts 123 and 124. The shaft 123 has a gear wheel 125 fixed on each end thereof adjacent the plates 117 and 118, the teeth of which intermesh with matching teeth on gear wheels 126 carried by the shaft 124. Shaft 123 also has fixed thereto a radially extending lever 129 which extends upwardly to a position in which it can be engaged by a pivoted lever 130 depending from the bracket 163 fixed to the plate 27. Movement of lever 129 in a counter-clockwise direction as viewed in FIGURE 6 imparts counterclockwise rotation to shaft 123 and to the gear wheels 125, thus rotating shaft 124 clockwise to rotate a cam 131 fixed to shaft 124. The rotation of the cam 131 clockwise imparts downward movement to the platen 120, against the pressure of the springs 121 and 122, clamping the card onto the table 26 and forcing the film portion into registry with the knife-like edges 116 of the opening 114 as shown in FIGURE 6.

The card feeding means 112 comprises a suitable motor 132 fixed by suitable means to the under surface of the support plate 25, see FIGURE 8. The motor may include suitable reduction gears to give the desired r.p.m. value to a drive shaft 135 driven thereby. A gear wheel 136 is fixed to the drive shaft 135 and a bearing arm 137 is journalled thereon which also journals a countershaft 138 in the opposite end thereof. The countershaft 138 has a gear wheel 139 secured to one end and has a wheel 140, formed of a friction material such as rubber, fixed on the opposite end portion. A spring washer 141 is carried by the countershaft 138 between the bearing arm 137 and the gear wheel 139 which frictionally brakes the rotation of the gear wheel 139 and shaft 138 with respect to said arm. This braking action causes the arm 137 and gear wheel 139 to rotate upwardly about the shaft 135 upon rotation of the gear wheel 136 in the direction of the arrow in FIGURE 8. The upward movement of the arm 137 from the position shown in dotted lines, with the bearing arm resting on the stop member 144 (see FIGURE 8) to the position shown in solid lines, will position the driving wheel 140 in the slotted openings 142 and 143 of the plates 25 and table 26, respectively. When the driving wheel 140 is thus raised, it engages the card 40, and the frictional braking force is overcome by pinching the card between the wheel 140 and a wheel 140a rotatably mounted on the plate 118, thus stopping any additional upward movement. When the vertical movement is stopped, the gear 139 and shaft 138 begin to rotate through the driving connection with the gear wheel 136, causing rotation of the driving wheel 140 advancing the card 40 into position between the plates 117 and 118 of the card positioning means on the table 26.

Figure 5:
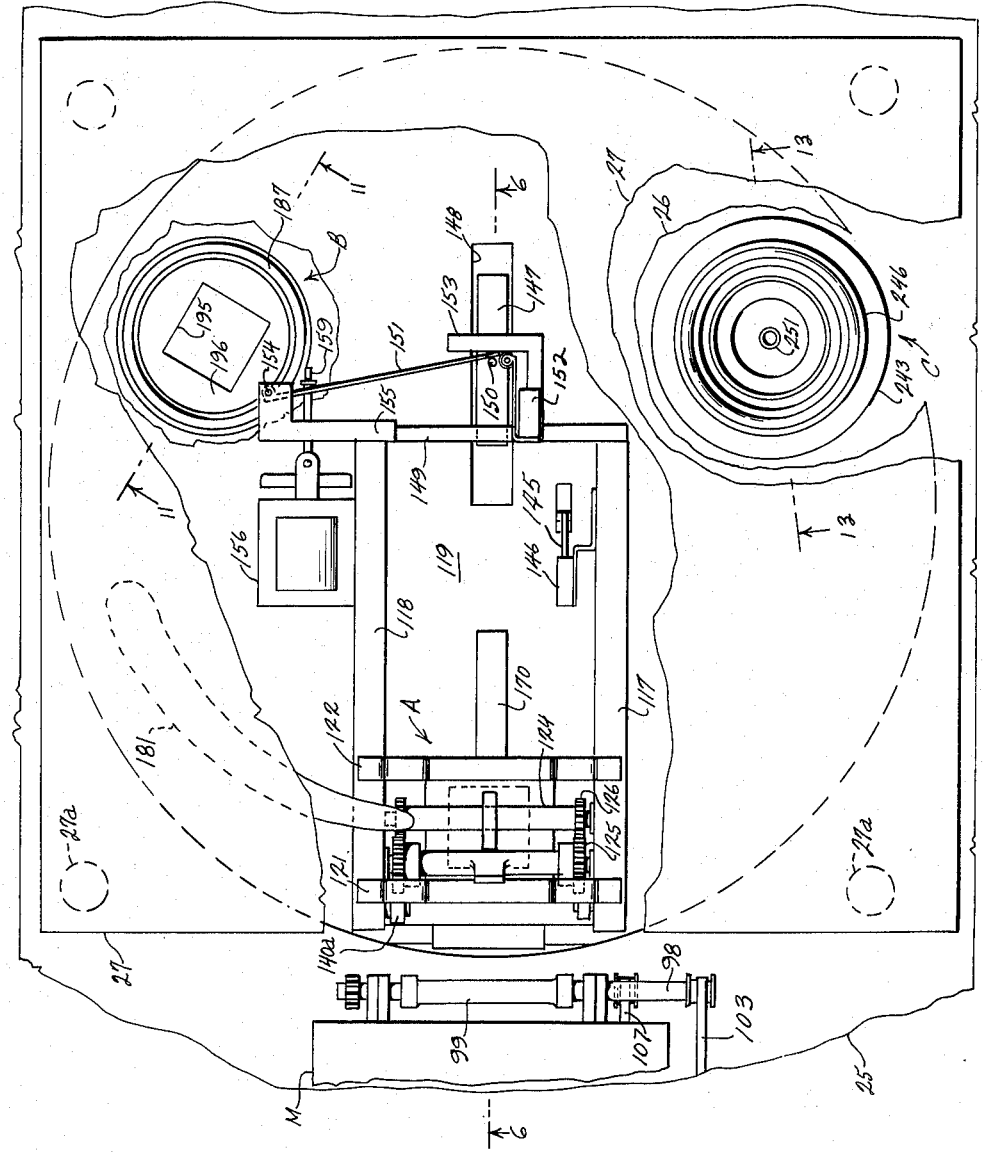
FIGURE 5 is a fragmentary plan view of the supporting structure, of the apparatus of FIGURE 1, certain of the parts being broken away; and certain parts located interiorly being shown in phantom lines.

As the wheel 140 drives the card into position, the leading edge of the card will strike an arm 145, see FIGURE 5, of a micro-switch 146, the arm of which extends through a slot in the plate 119. The leading edge of the card also abuts against one end of a slide bar 147 slidably mounted in a groove 148 formed in the table 26. As the card abuts the bar 147, it slides it rearward in the groove 148 until the card strikes and is stopped by a bar 149 fixed to and extending between the vertical plates 117 and 118.

As shown in FIGURES 5 and 6, a vertically extending pin 150 is secured to the upper surface of the bar 147 and is engaged on one edge by a lever 151. Rearward movement of the lever 151 upon contact with the pin 150 actuates another micro-switch 152 and the rearward movement of said lever is limited by an L-shaped bracket 153 fixed at one end to the bar or card stop 149. The lever 151 is pivotally mounted at its opposite end on a pin 154 carried by a second L-shaped bracket member 155 which is also secured to the bar 149.

The lever 151 and the slide bar 147 act to discharge the card from the table when the processing is completed and while the card positioning and clamping means are in position over the drying station C. Movement of the slide bar 147 is effected by the lever 151 which is operated by a card ejector solenoid 156 mounted on the upright plate 118. The armature 157 of the solenoid 156 is pivotally connected to a link 159 which extends through the lever 151. Upon operation of the card ejector solenoid 156 the lever 151 is pivoted clockwise as shown in FIGURE 5 about the pin 154 and forces the sliding bar 147 to the left in the slot 148 to force the card outwardly from between the plates 117 and 118.

After the card has been inserted between the plates 117 and 118 as described, the aforementioned lever 129 is rotated to lower the platen 120 and clamp the card in position. The lever 129 is forced counterclockwise as shown in FIGURE 6. This is accomplished by actuation of a solenoid 160 which is mounted on the plate 27 in a fixed position above the exposure station A. The armature of the solenoid 160 is connected by means of a link 162 to the upper end of the aforementioned lever 130 which is pivotally mounted on the bracket 163. An adjustable stop 164 is fixed to the plate 27 adjacent the ends of levers 129 and 130 to allow a predetermined amount of clamping force to be applied to the platen while it is positioned at the exposure station. A micro-switch 134 mounted adjacent the stop 164 is engaged by the lever 129 and operated thereby. The function of this switch 134 will be described in connection with the electrical circuitry.

The platen 120 has a Teflon covered rubber pad 165 fixed on the under side thereof which is engageable with the film portion 39 of the card. The platen 120 is fitted with a heating pad 166 mounted in a slot 167 therein above the pad 165. Above the heater 166 in a bore 169 is a thermostat 170 to maintain the platen and the pad 165 at a controlled optimum temperature to facilitate rapid development of the film section.

When the card is positioned and clamped with the film section 39 thereof in registry with the opening 114 and the remaining portions of the card masked, the machine is ready to expose and process the sensitized film section.

The exposure station A comprises a cylindrical collar member 171 mounted within an opening 172 formed in the support plate 25. The member 171 has an upstanding ring portion projecting above the plate 25 which is formed with a groove 173 in which is fitted a quad-ring 174. Secured to the collar member 171 below the plate 25 is the lens and shutter component 34. The shutter 175 is operated by a solenoid 176 connected thereto by a link 177.

After the film is exposed, the turn table 26 is raised out of contact with the quad-ring 174 and is rotated through approximately 120° by a turn table supporting and drive shaft 180 to position the aperture 114 at the developing station B. The shaft 180 is driven by the mechanism E to be described hereinafter. As the table is rotated between these stations, the upstanding lever 129 on the shaft 123 engages and follows a cam 181 fixed to the under side of the plate 27. The cam 181 causes the lever 129 to rotate the shaft 123 counterclockwise, thus rotating the shaft 124 and cam 131 by means of the gear wheels 125 and 126 to lower the platen 120 and clamp the film section 39 into tighter engagement with the opening 114 in the table 26. At the developing station B the table 26 is lowered in position before the developing process begins.

Figures 11, 12:
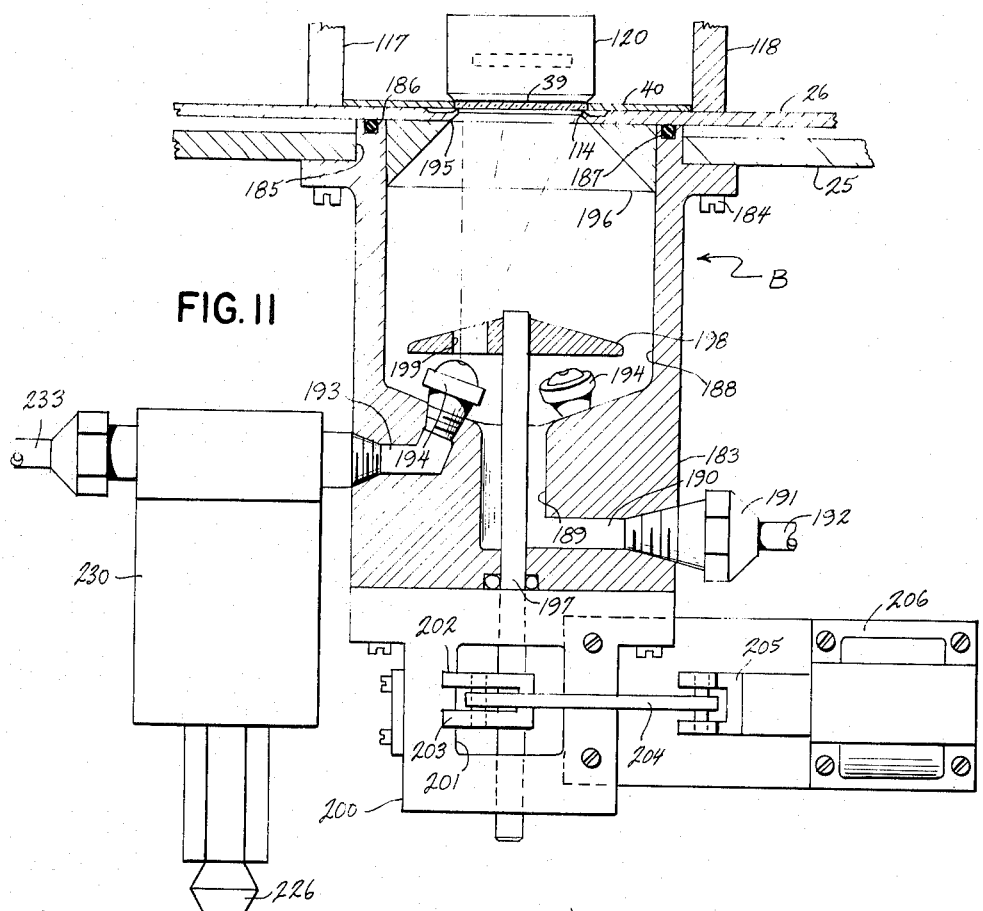
FIGURE 11 is a vertical sectional view taken approximately along the line 11—11 of FIGURE 5.
FIGURE 12 is a fragmentary bottom view of the structure shown in FIGURE 11.
Figure 13:
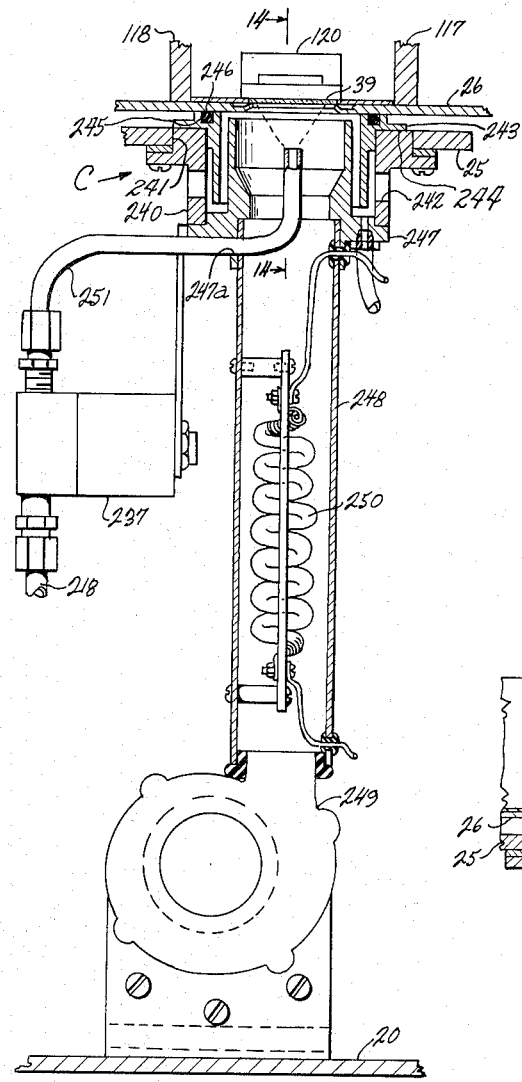
FIGURE 13 is a vertical sectional view taken substantially along the line 13—13 of FIGURE 5.
Figure 14:
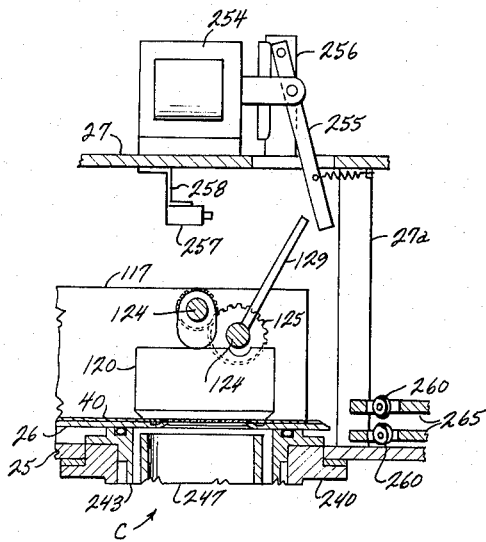
FIGURE 14 is a vertical sectional view taken approximately along the line 14—14 of FIGURE 13.

The developing station B illustrated in FIGURES 11 and 12 comprises a cylindrical body 183 secured by suitable fastening means such as the screws 184 to the main support plate 25. The cylinder 183 extends upwardly through an opening 185 in the plate 25 and is formed with a groove 186 in the upper peripheral edge thereof in which is placed a quad-ring 187 which forms a seal between the table 26 and said cylinder. The cylinder is formed with several borings; a large central bore 188 forms the main processing chamber and a somewhat smaller central bore 189 is formed in the lower portion thereof. The bore 189 connects with a radial bore 190 forming a drain which communicates by a coupling 191 and a tube 192 to a suitable residue container (not shown). Three other borings, one of which is shown at 193, are formed in the lower portion of the cylinder 183 and act as a portion of the supply line for the developing, fixing and washing solutions of the processing station. Nozzles 194 (only two of which are shown in FIGURE 11) are fitted at the end of the borings 193 within the main processing chamber 188. These nozzles are of a low pressure type and have the orifices therein directed upward toward an opening 195 formed in a ring 196 mounted in the upper open end of the cylinder 183. The opening 195 substantially matches the opening 114 formed in the table 26.

The nozzles 194 are each connected respectively to a suitable supply of developer, fix and wash solution and operate independently to direct a spray of each solution onto the exposed film insert to develop the same. Also in the developing station B a charge of air is directed against the film insert after it has been sprayed with the wash solution to remove large moisture droplets. The air is supplied to the chamber 188 through a tube 197. The tube 197 may be formed of plastic and extends upwardly through the center of the cylinder 183. A shield 198, which is formed with three openings 199 corresponding to the positions of the nozzles 194, is mounted on the upper end of the tube 197. The plastic tube 197 is rotatable within the cylinder 183 and acts as a shaft to rotate the shield 198 mounted on the upper end thereof, the shield being for the purpose of covering the nozzles except when they are in operation.

This shield 198 cuts off the possibility of any spray striking the table 26 as it moves over the developing station during other operations thereof. During the spray processing the platen 120 holds the film section 59 tightly against the edges 116 of the opening 114 in table 26 thus preventing any solution from damaging the card or from the air blast driving any solution back on the film section 39 between the film section and edges 116.

Secured to the bottom of the cylinder 183 is a frame member 200 through which the tube 197 also extends.

The frame 200 is formed with a transverse opening in the center thereof in which a pair of crank arms 202 and 203 are connected to the tube 197. The free end of the crank arms 202 and 203 are pivotally connected to one end of a link 204 which is pivotally connected at its opposite end to the armature 205 of a solenoid 206. The solenoid 206 is mounted in aligned relationship with the frame 200 to rotate the tubing 197 through the crank arms 202 and 203 and to rotate the shield 198 from one position covering the nozzles to a position aligning the openings 199 with the nozzles as shown in FIGURE 11.

Figure 17:
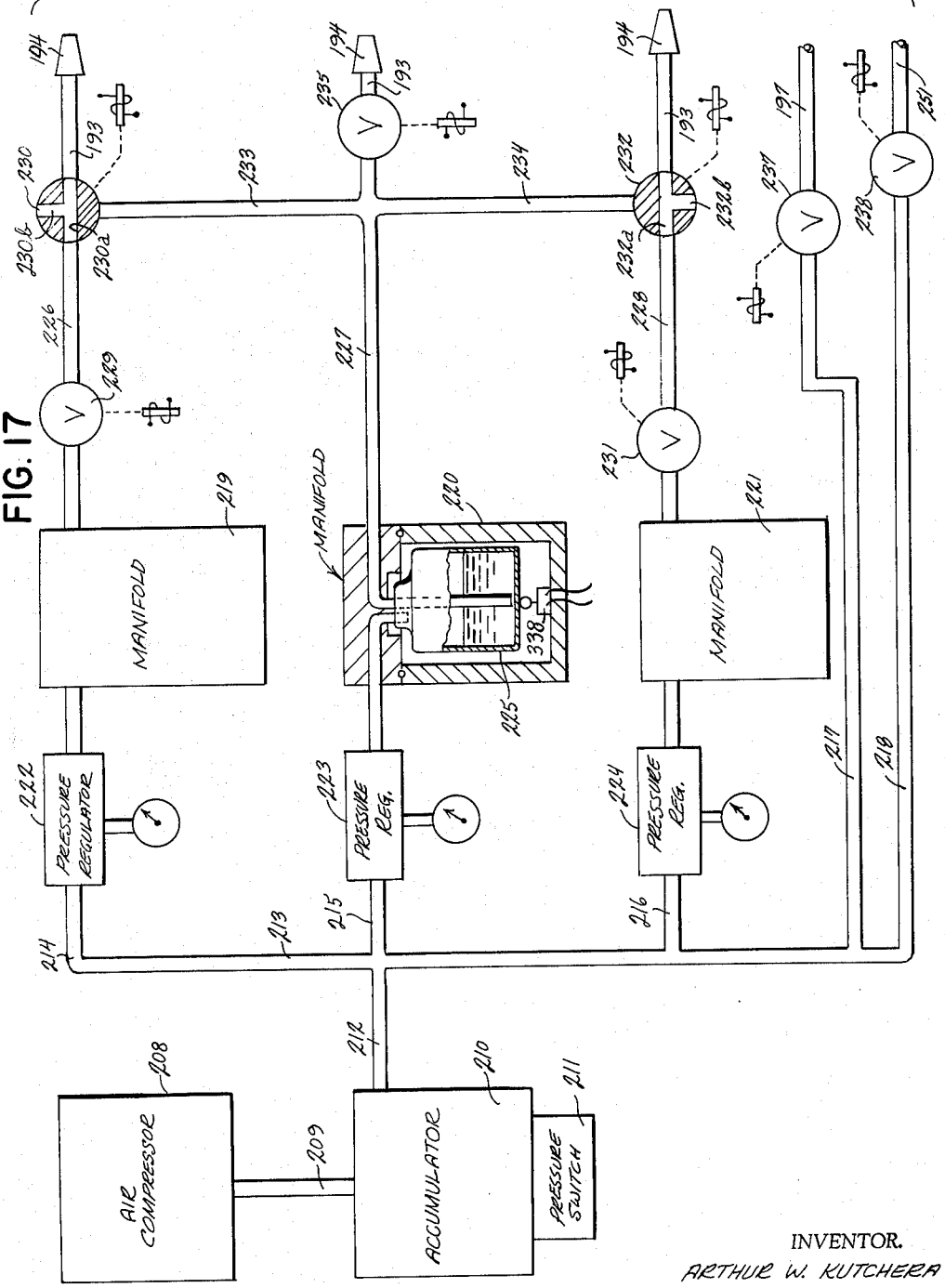
FIGURE 17 is a diagrammatic view of the fluid system.

Referring now to FIGURE 17, there is shown diagrammatically the fluid system of the apparatus. An air compressor 208, or some other source of fluid pressure, is used to pressurize the system and is suitably connected by conduit 209 to an accumulator 210 which is provided with a pressure switch 211. The accumulator 210 is connected by conduit 212 to a main line 213 having branch or lateral lines 214, 215, 216, 217 and 218. Each of the lines 214, 215 and 216 are connected to covers which when positioned on their respective containers form hermetically sealed enclosures 219, 220 and 221 which have enclosed therein a supply bottle 225 (only one of which is shown) of developer solution, wash solution and fix solution, respectively. Each line 214, 215 and 216 has a pressure regulator 222, 223 and 224 mounted thereon with the associated indicating gauge.

The pressure in each container 219, 220 and 221 places the solution in the bottles 225, under pressure to charge the fluid supply lines 226, 227 and 228, respectively. The developer supply line 226 has a normally closed solenoid operated valve 229, and a three-way solenoid operated valve 230 in said line, and is connected to a nozzle 194 in the developing station B. The fix supply line 228 leading to a nozzle 194 is similarly controlled by a normally closed solenoid valve 231 and a three-way solenoid controlled valve 232. The supply line 227 for the wash solution communicates with a pair of lines 233 and 234 leading to the three-way solenoid valves 230 and 232 respectively, and is connected through a normally closed solenoid valve 235 to a third nozzle 194 in the developing station B.

The valves 230 and 232 are provided for flushing the developer and fix solution nozzles and are normally positioned such that the passages 230a and 232a thereof connect the lines 228 and 226 directly with the respective nozzles 194. Upon operation of the respective solenoids for the valves, to flush the nozzles, the valve 230 is rotated clockwise as shown in FIGURE 17 to allow the wash solution to flow through the line 233 into the passage 230a and through a passage 230b to the developer nozzle 194 and the valve 232 is rotated counterclockwise such that supply line 234 communicates with passage 232a and a passage 232b directing the wash solution to the fix nozzle 194 to thereby clean the nozzles.

The branch line 217 from the main line 213 is connected to a normally closed solenoid valve 237 and to the tube 197 extending into the developing station B. The branch line 218 is connected to a normally closed solenoid valve 238 and is connected to a tube 251 in the drying station C to be hereinafter described. These lines serve to direct a charge of air against the film section in each of the two stations.

The drying station C (see FIGURE 12) to which the card is moved upon completion of the developing cycle comprises a main supporting cylinder 240 fitted in an opening 241 in the main support plate 25 and is secured thereto by suitable fastening means. This main cylinder 240 is provided with exhaust holes 242 formed in the wall portion thereof and has a second cylindrical member 243 telescoped into the upper end thereof. The cylinder 243 has shoulder portions 244 engaging the upper surface of the cylinder 240 and has a groove 245 formed in the upper peripheral edge thereof. A quad-ring 246 is fitted in the groove 245 and forms a seal between the table 26 and the inner surface of the cylinder. A third cylindrical member 247 is telescoped into the lower portion of the cylinder 240 and defines the drying chamber. The three rings or cylinders assembled as shown in FIGURE 12 form a labyrinth seal between the exhaust ports and the main drying chamber with the table 26 and insert 39 covering the upper end thereof. Depending downwardly from the inner cylinder 247 is an elongated tube 248 which has a heating element 250 mounted therein. A blower and motor unit 249 has the discharge passage thereof connected to the lower end of said tube and acts to force air through the tube around the heating element 250 forcing the hot air onto the film section 39. Also positioned within the drying chamber defined by the cylinder 247 is the tube 251 which extends through an opening 247a formed in said cylinder and has the end thereof directed toward the film section 39. The other end of the tube 251 is suitably connected to the solenoid valve 238 by which it communicates with the air line 218.

When the drying cycle is nearly completed and before the blower 249 is de-energized, a card release solenoid 254 is energized which is connected to a pivoted arm 255. The solenoid 254 is mounted on the support plate 27 above the drying station C and the arm 255 is pivotally connected at one end to a bracket 256 and has the opposite end depending downwardly to a position adjacent the lever 129 carried over the platen 120, actuation of the arm 255 swings the lever 129 allowing the platen 120 to raise from clamping position and the air directed against the insert 39 will raise it out of engagement with the knife-like edges defining the opening 114 in the table 26. This allows the moisture around the edges of the opening 114 to be dried.

As the arm 255 releases the platen 120, the lever 129 strikes a micro-switch 257 which is mounted on the plate 27 by a bracket 258. The micro-switch 257 serves to de-energize the solenoid 254 upon actuation thereof.

The card 40 is now ready to be discharged from the table 26 and upon actuation of the aforementioned solenoid 156 (see FIGURE 6) the slide bar 147 strikes the edge of the card 40 driving it out from its position between the plates 117 and 118. As the card moves outwardly, the end portion thereof, in which the insert is positioned, is picked up between two pairs of opposed rollers 260 only the upper pair of which are shown in FIGURE 2. The rollers 260 comprise a part of the discharging mechanism generally designated 259.

The discharging mechanism 259 further includes a second set of opposed rollers 261. The rollers 260 and 261 are mounted on suitable shafts bearinged in a frame structure 262 in the form of a hollow rectangular enclosure. The shafts are driven by a motor 263 mounted on the upper surface of a second frame 264; a belt 265 entrained on a drive pulley and suitable pulleys carried on one end of each of the four shafts carrying the rollers 260 and 261 drive the same to feed the card into the frame 264.

The frame 264 is substantially triangular shaped in plan having a top and a bottom plate member spaced apart to allow a card to pass therebetween. When the card is fed into the frame 264, the leading edge will operate a micro-switch 266 and a blade 267, positioned between the plates forming the card chute or frame 264, will brush the card off of the bottom plate thereof into the container D which stacks the cards as they are discharged from the machine.

The blade 267 is fixed at one end to a shaft 268 which is rotated by a motor 268a mounted beneath the chute frame 264. Secured to the shaft 268 above the top plate of the chute is an arm 269. The arm 269 is radially aligned with the blade 267 in reference to the shaft 268 and is connected to a spring 270 which serves to return the blade 267 and arm 269 to a position along the forward edge of the frame 264. A micro-switch 271 is positioned on the upper surface of the frame 264 and is actuated by the arm 269 when the shaft 268 is rotated clockwise to swing the blade 267 across the bottom plate of said frame brushing the developed and dried card therefrom. The switch 271 also acts to limit the travel of the arm 269 and the blade 267.

After the card is discharged from the turn table 26, the table is raised out of sealing engagement with the quad-ring 246 at the drying station C and is rotated to its initial position with the aperture 114 again aligned over the exposure station A.

Figure 15:
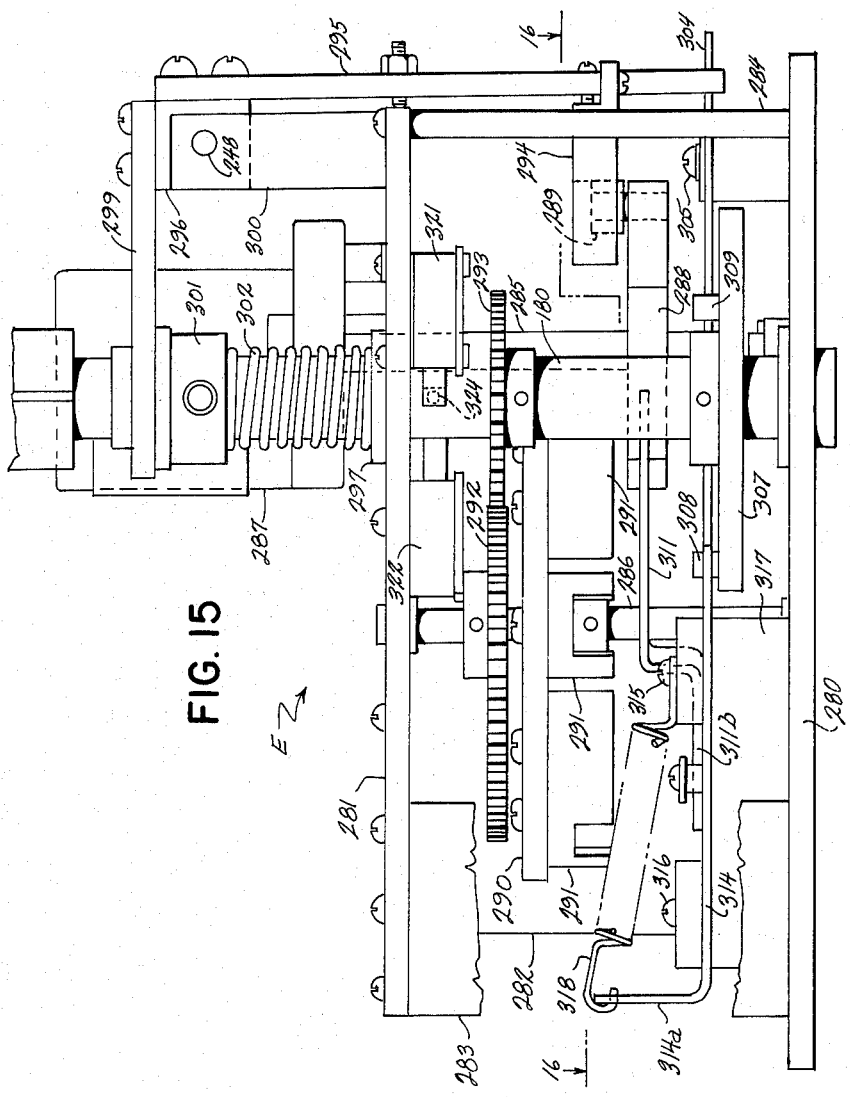
FIGURE 15 is an elevation view of the drive mechanism.
Figure 16:
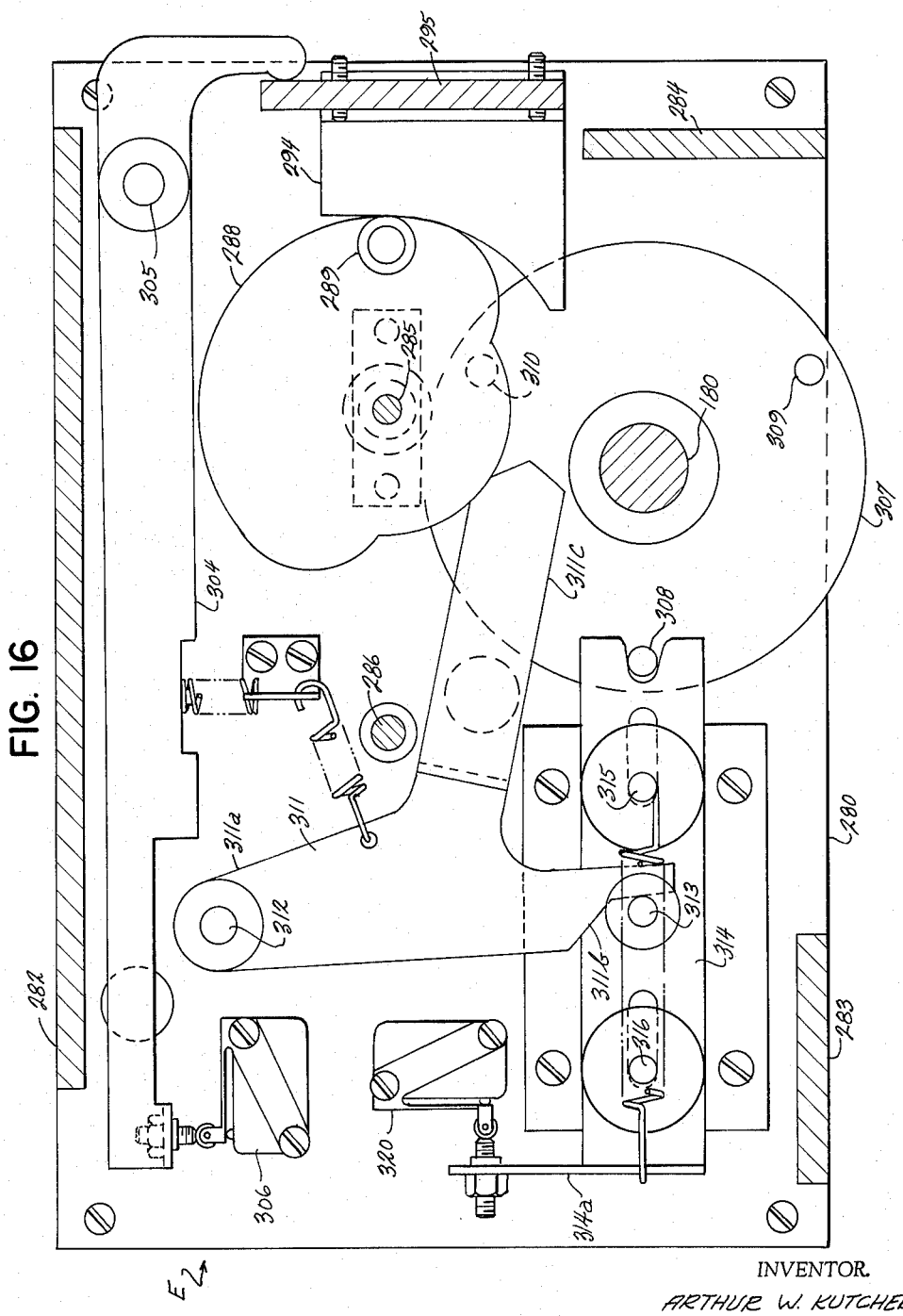
FIGURE 16 is a longitudinal sectional view taken along the line 16—16 of FIGURE 15.

The drive mechanism E shown most clearly in FIGURES 15 and 16, which serves to rotate and position the turn table 26 through the medium of the shaft 180, is mounted on the platform 20 and comprises a base plate 280, an upper plate 281, a side plate 282 and a pair of small upstanding side plates 283 and 284. Three main shafts, the turn table supporting and driving shaft 180, a cam drive shaft 285, and a Geneva plate supporting shaft 286 extend vertically between the bottom plate 280 and the top plate 281 and are suitably bearinged therein. The shaft 285 is driven by a motor 287 mounted on the top plate 281. Secured to the shaft 285 is a cam 288 which carries an upstanding lug cam 289 adjacent one edge. The cam 289 is engageable alternately with six circumferentially spaced cam follower blocks 291 which are secured to the under side of a Geneva plate 290. On each rotation of the shaft 285 the cam 289 is engageable with the slotted portion of one of the cam follower blocks 291 to rotate the Geneva plate 290 through one-sixth of a revolution or 60°. Rotation of the Geneva plate 290 by 60° rotates the shaft 286 accordingly and also rotates a gear 292 fixed to said shaft and positioned above the Geneva plate 290. The teeth on the gear 292 intermesh with the teeth on a gear 293 which is secured to the main turn table drive shaft 180. The gear ratio between the gear 292 and the gear 293 is 1:2, to effect a rotation of the main turn table drive shaft 180, one-third of a revolution or 120° upon a rotation of the gear 292 through one-sixth of a revolution. A rotation of the main drive shaft 180 through 120° will move the table 26 from one station to another station as described above.

The upstanding cam member 289 is also engageable upon each revolution thereof with a cam follower 294. When the upright member 289 strikes the cam follower 294, a bell crank is rotated about a horizontal axis to raise and lower the main turn table drive shaft 180. This movement will effect the seal desired between the turn table 26 and the quad-rings associated with each of the stations. The bell crank comprises a vertically extending plate member 295, to which the cam follower 294 is secured, and a horizontally extending plate member 299. The plate members 295 and 299 are each secured respectively to adjacent sides of a pivoted bar 296 which extends transversely, as viewed in FIGURE 15, between two upright bracket members 300. The bar 296 has a pin 298 extending longitudinally therethrough forming the pivot axis for the bell crank member. The plates 295 and 299 are transversely offset along the axis of the bar 296 to properly position the same with respect to the cam 289 and the drive shaft 180. Upon each rotation of the shaft 285 and the cam 289, the bell crank member is pivoted about the axis of the pin 298 to lower the main turn table drive shaft 180 and the turn table 26. The plate member 299 is formed with a slotted opening in one end portion surrounding the shaft 180. The plate 299 abuts a sleeve 301 secured to the shaft 180 and positioned below said plate. A helical compression spring 302 is positioned below the sleeve 301 around the shaft 180 between said sleeve and a bearing sleeve 297 mounted on the top plate 281.

Actuation of the cam follower 294 and the plate member 295 secured thereto also serves to pivot a horizontally positioned crank arm 304, which lies along the side plate 282. The crank arm 304 has one end thereof engaging the vertical plate 295 and the opposite end thereof actuating a micro-switch 306. The lever 304 is pivoted about a vertically positioned pin 305 adjacent the shorter leg thereof as viewed in FIGURE 16.

This drive mechanism E also serves to accurately position the turn table at each of the aforementioned three stations. This indexing and locking mechanism of the drive mechanism E comprises a circular plate member 307 fixed to the main turn table drive shaft 108 adjacent the bottom plate 280. The plate 307 has three upstanding lugs 308, 309 and 310 fixed to the upper surface thereof in positions corresponding to the positions of the stations A, B and C of the mechanism aforedescribed. The projections 308, 309 and 310 are engaged by the slotted end portion of a sliding bar 314. The sliding bar 314 is provided with suitable slots on the upper side thereof through which extend pins 315 and 316, projecting upwardly from a spacer block 317. A crank lever 311 which is pivoted about a pin 312 extending through one end portion 311a thereof has a second end portion 311b engaging a lug 313 which is secured to the upper surface of the bar 314. A third arm 311c of the crank 311 is urged against the cam surface of the cam 288 and is actuated thereby to unlock the drive shaft 180 by forcing the bar 314 away from the locking lug 308 on the plate 307. An upwardly bent flange portion 314a of the bar 314 is connected to one end of a tension spring 318, the opposite end of which is secured to the pin 315. This spring member serves to drive the bar 314 across the upper surface of the spacer block 317 such that the slotted end portion thereof will engage one of the upstanding projections on the interlocking plate member 307. When the bar 314 is engaging a lug 308, 309 or 310 on the plate 307, the turn table is centered and properly aligned with the opening 314 thereof positioned at one of the stations. When the plate is unlocked, the cam 289 can rotate the Geneva plate 290 and the turn table 26 to rotate it to the next station. The cam 288 then rotates back to the position where the lug 289 engages the cam follower 294 as shown in FIGURES 15 and 16. At this point the drive shaft 180 is locked in position and the bell crank, comprising the plates 295 and 299, forces the shaft downward to seal the table 26 in position. The vertical movement of the table 26 is only a small amount within the range of .010 to .030 inch, but is sufficient to seal the same on the quad-rings and rise free of the same before rotation. The spring 302 acts against the sleeve 301 to raise the table when the cam 289 moves away from the cam follower 294.

The locking bar 314 serves to operate a microswitch 320 mounted adjacent thereto as shown in FIGURE 16. Three micro-switches 321, 322 and 323, only two of which are shown in FIGURE 15, are mounted on the top plate 281 of the drive mechanism E adjacent the turn table drive shaft 180 and are actuated by a lug 324 projecting radially from said shaft. The switches 321, 322 and 323 are associated with the exposure station A, developing station B and drying station C, respectively, and serve as safety switches to the extent that the process carried on at each of said stations will not be operable unless the corresponding switch is operated.

*Operation sequence and electrical circuit*

The following description will explain the operation of the machine cycle and the operation of the electrical circuitry forming a part of the illustrated apparatus.

The control panel P on the apparatus provides four manual control switches, an "on" switch 325, a "print" switch 326, an "off-flush" switch 327 and a "partial-print" switch 328. The panel P also includes certain pilot lights.

indicating to the operator various conditions existing within the apparatus and said lights include a lamp 329 indicating the machine is "on," a lamp 330 indicating the machine is "ready" for operation, a lamp 331 operated by a micro-switch 332 to indicate when the machine is out of cards, a lamp 333 operated by a switch 334 to indicate when the bottle containing developer is empty, a lamp 335 operated by a switch 336 to indicate when the bottle containing the fix solution is empty, a lamp 337 operated by a switch 338 to indicate when the bottle containing the wash solution is empty, and a lamp 339 indicating when the apparatus is on the flushing or cleaning cycle. A control knob is also positioned on the panel P to operate a rheostat 340 controlling the intensity of the lamps 30 and 31. The apparatus is also preferably provided with a photoelectrically controlled diaphragm opening adjustment for the lens component 34.

Except for the above-mentioned manual controls, the operation sequence is completely automatic to the extent that the machine will complete the intended cycle or shut off in case of a failure of the machine, or lack of cards or solutions. The automatic cycle is controlled by a commercial Cramer Multiple-Program Cycling Timer having a motor 341 and comprising twenty cam-operated switches identified hereinafter as C1 to C20, all of which are double throw switches; however, several are used as single throw switches as illustrated in the drawing.

Figure 18:
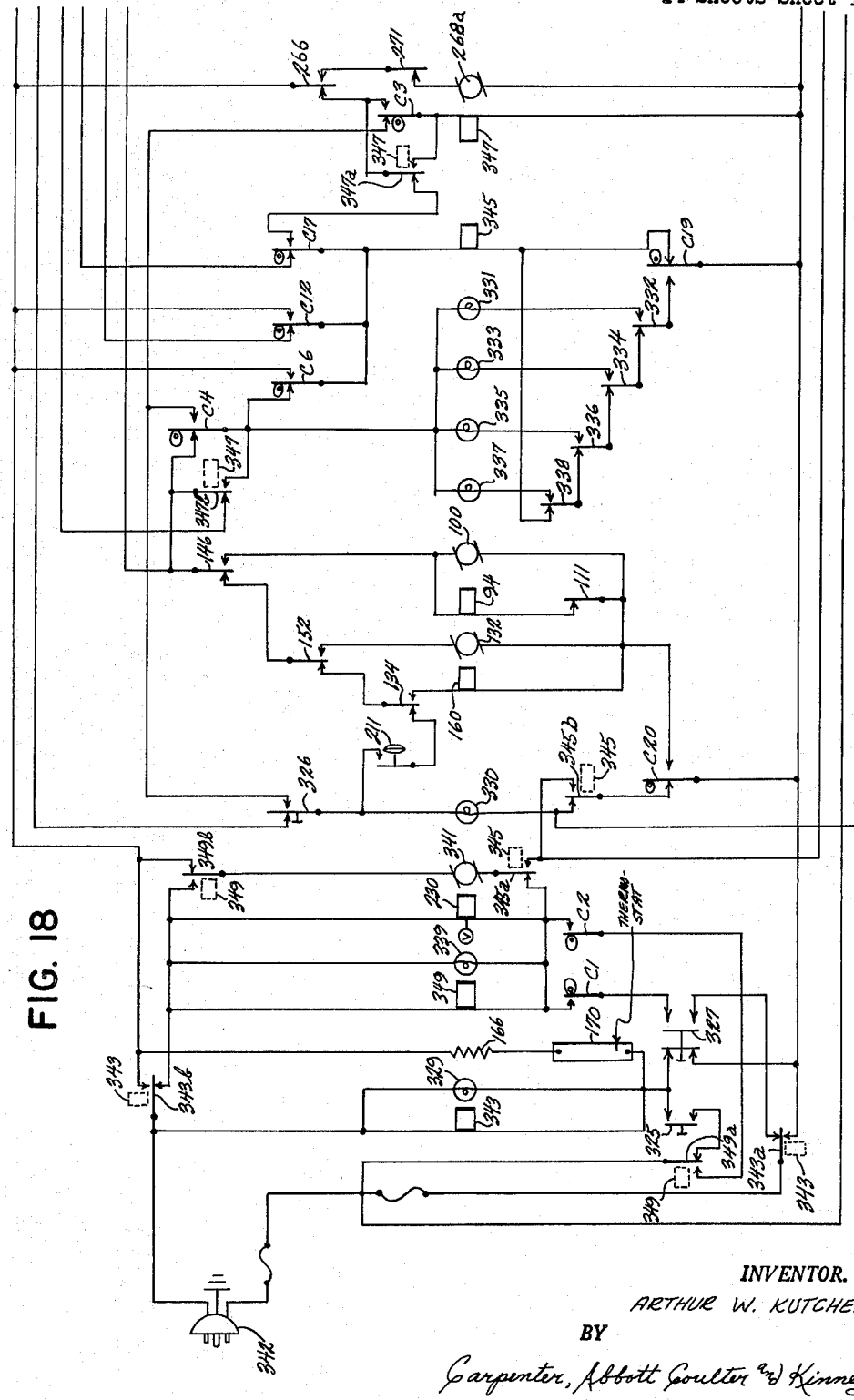
FIGURES 18 and 18a are a schematic diagrammatic representation of an electrical circuit of the improved apparatus.
Figure 18A:
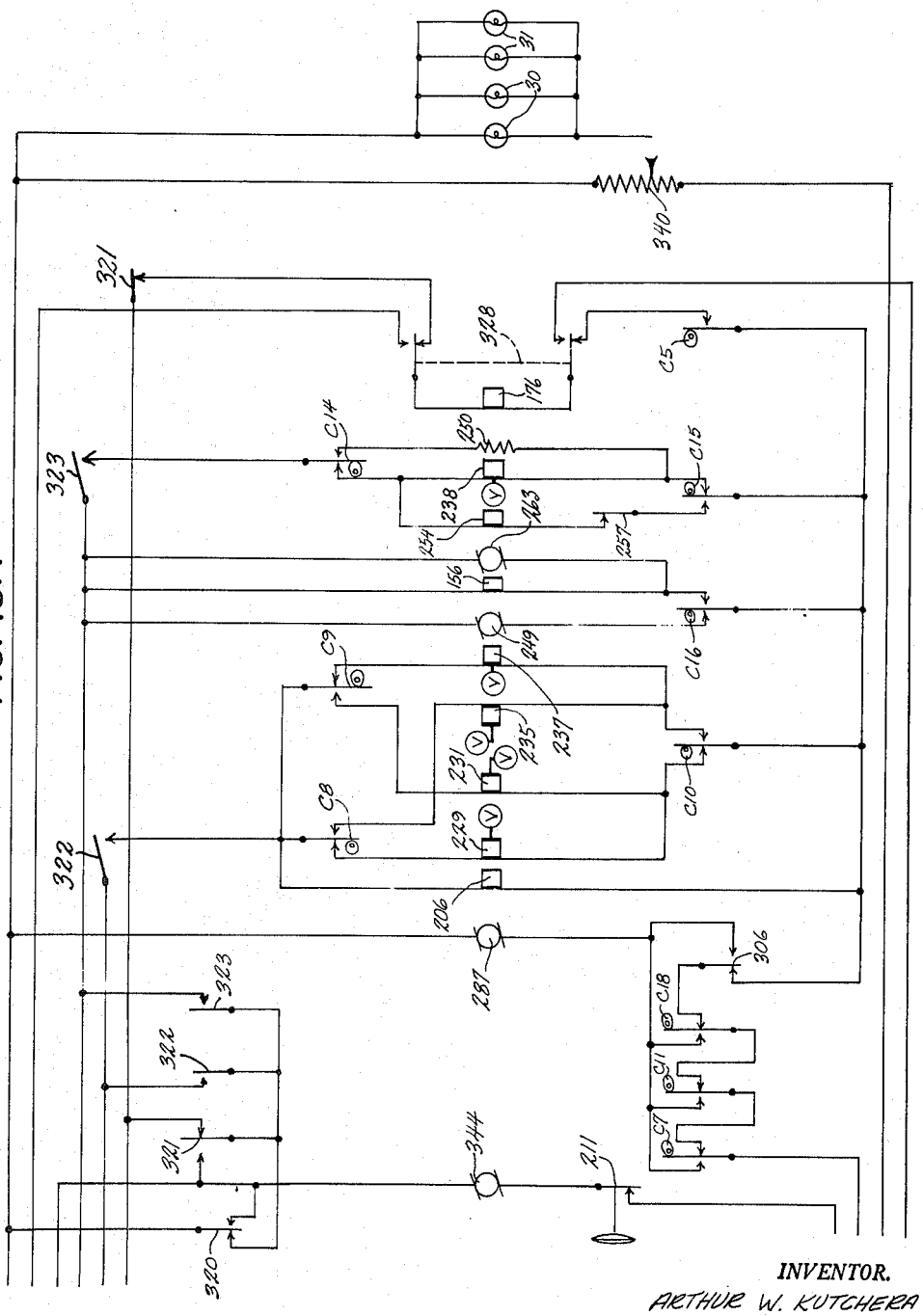

The schematic diagram of FIGURES 18 and 18a represents the position of the switches with the machine off, cards 40' in the magazine M, solution in each of the three bottles 225 and with one card positioned and clamped on the turn table 26, and with current being supplied to the circuit from a suitable source 342. To turn the machine on the operator momentarily pushes the push button of the momentary contact "on" switch 325 which closes a circuit from the power source 342 to a power relay 343. The power relay 343 is then self-holding through its own contacts 343a and 343b and the off-flush switch contacts 327 so it remains operated when the operator releases the button of the "on" switch 325. The operated power relay controlled circuit lights the "on" pilot lamp 329, completes the circuit to the card heating pad 166 through the thermostat 170, turns on the print lamps 30 and 31, starts a motor 344 for the compressor 208 and operates a relay 345 to move the contacts 345a and 345b thereof to their alternate position. The operated relay 345 starts the motor 341 of the programming device. Cam switches C1 and C2 are then closed and cam switch C4 is moved which releases the relay 345 to stop the cam motor 341 and when the accumulator 210 reaches the desired pressure switch 211 operates to stop the air compressor motor 344 and light the "ready" pilot light 330 indicating the machine is now ready for operation.

When the operator wants to make a card bearing a photographic negative on a document, etc., the document 36 is placed on the stage S and then the operator pushes the push button of the momentary contact "print" switch 326. The "print" switch 326 closes a circuit which energizes a relay 347 which is self holding through the micro-switch 266 and will remain energized when the "print" switch 326 is released. The relay 347 prevents the air compressor motor 344 from starting and energizes the relay 345, which turns off the "ready" pilot light 330, and starts the motor 341 which operates the programming device, opening switch C1 to prevent the "off-flush" switch 327 from starting the flush cycle. Cam switch C3 is operated providing a separate holding circuit for the relay 347 such that if the operator turns the machine off and then starts it again, the relay 347 will operate with the "on" switch 325 and the machine will continue the "print" cycle. The cam switch C4 is then returned rendering the "print" switch 326 inoperative and routes the holding circuit for the relay 345 through the microswitch 321. Next, the cam switch C5 is closed which operates the solenoid 176 connected to the shutter of the lens component 34, opening and closing said shutter and then said cam switch C5 is again opened. Now the exposure process is completed and the table 26 is indexed to the developing station B.

The indexing is automatic and begins by the programmer throwing the cam switch C6 which makes the holding circuit for relay 345 independent of the micro-switch 321. Next, cam switch C7 is thrown breaking the power circuit to the processing stations and starts the motor 287 on the drive mechanism E. The motor rotates the cam 289 releasing the bell crank allowing table 26 to rise and lever 304 to throw the micro-switch 306. The switch 306 breaks the power circuit to the processing stations and when cam switch C7 is thrown again or released to its original position, switch 306 will hold the circuit to the drive motor 287 and the same will continue to run. Rotation of the cam drive shaft 285 and cam 288 will release the lock mechanism between the locking bar 314 and lug 308 and throws the micro-switch 320. The cam 289 engages a follower 291 on the Geneva plate 290 rotating the aperture 114 in the plate 26 to the developing station B. This rotation throws the micro-switch 321, as the lug 324 is moved by the rotation of the turn table drive shaft 180 and this rotation also moves the lever 129 away from micro-switch 134 to throw the same. When the table is positioned at the developing station B, the lug 324 closes the micro-switch 322, bar 314 locks on the lug 309, returning the micro-switch 320 to its original position and the cam 289 lowers the table 26 and lever 304 returns the switch 306 to its original position stopping the drive motor 287. The switch 306 also restores the power circuit through cam switches C7, C11 and C18 to the processing stations. Cam switch C6 returns to its initial position and routes the holding circuit for the relay 345 through the micro-switch 322 closed by the lug 324. If the micro-switch 322, the micro-switch 320 and micro-switch 306 have all operated properly, the operation of the micro-switch 306, indicating the table is clamped down in place over the developing station B, will start the developing process. Should the switches above indicated fail to operate properly, relay 345 will be de-energized when cam switch C6 is returned to its initial position and drive motor 287 will stop.

The return of the micro-switch 306 to its initial table locked position directs current to the solenoid 206 to rotate the shield 198 uncovering the nozzles 194. The current to the developing station also energized the solenoid valve 229 allowing developer to be sprayed against the card insert 39. A few seconds later cam switch C8 is thrown and solenoid valve 229 closes. Time is allowed for the developer solution to work and cam switch C9 is thrown energizing solenoid valve 231 and fix solution is sprayed against the film section. Cam switch C10 is then thrown de-energizing the solenoid valve 231 and energizing the solenoid valve 235 in the wash solution supply line. When cam switch C8 returns to its initial position, the wash solenoid valve 235 is closed and then cam switch C9 is returned to its initial position and solenoid valve 237 is opened impinging a blast of air against the film section which removes the liquid droplets adhering thereto. After a very brief air blast cam switch C11 is thrown de-energizing the circuit to the developing station and consequently the solenoid valve 237 is closed completing the film developing process.

The plate 26 is now ready to be indexed to the drying station C and when cam switch C11 was thrown the drive motor 287 is again energized. Cam switch C12 is thrown which makes the holding circuit for the relay 345 independent of the micro-switch 322. Rotation of the cam drive shaft 285 by the motor 287 releases the table clamp on the table and lever 304 moves free of the micro-switch 306 which is then thrown. Switch 306 also breaks the power circuit to the developing station B and closes an alternate circuit to the drive motor 287 and then cam switch C11 is thrown. As the cam 288 is rotated the bar 314 releases the plate 307 and micro-switch 320 is thrown. The cam 289 engages a follower 291 on the Geneva plate 290 and indexes the table 26 to position the aperture 114 at the drying station C. As the table is turned micro-switch 322 is opened, cam switch C10 is returned to its initial position and micro-switch 323 (the third micro-switch mounted on plate 281 adjacent the drive shaft 180) is closed. The lock 314 closes on lug 310, returning micro-switch 320 to its initial position and the table is clamped returning micro-switch 306 to its initial position once again. The switch 306 breaks the circuit to the drive motor 287 and routes current therethrough to the processing stations. When cam switch C12 is returned to its initial position, the holding circuit for the relay 345 is directed through the micro-switch 323. With the switch 323 closed and switches 320 and 306 returned to their initial position, the drying process will begin.

The drying process began with the micro-switch 306 being returned to its initial position energizing the processing stations. The solenoid valve 238 was opened directing an air blast to the film section through line 251 and the blower motor 249 was energized. The valve 238 is open only briefly and then cam switch C14 de-energizes the solenoid and completes a circuit to the heater 250 above the blower 249. Shortly the cam switch C15 is thrown de-energizing the circuit to the heater 250. Cam switch C14 returns to its initial position and the solenoid 254 is operated to unclamp the platen 120 from the card and film section. The lever 129 is swung in the unclamping operation to open switch 257 de-energizing the solenoid 254. Now with the card unclamped the blower can dry the edges of the film section that were clamped.

The cam switch C3 is now returned to its initial position and cam switch C16 is operated stopping the blower motor 249. The cam switch C16 also energizes the card ejector solenoid 156 and the motor 263 on the card discharged chute 259. As the slide bar 147, operated by solenoid 156, pushes the card into the chute of the discharge mechanism 259, the card throws the micro-switch 266 thus de-energizing relay 347. The switch 266 energizes the circuit to the motor 268a which rotates the shaft 268 and the blade 267 brushes the card into the card container D. As the solenoid 156 operated the slide bar 147, the lever 150 allowed the micro-switch 152 to be thrown to its alternate position and as the card was pushed outwardly between the plates 117 and 118 the micro-switch 146 was thrown to its alternate position upon being released from the card.

The rotation of shaft 268 also swings the arm 269 against the micro-switch 271 opening the same to de-energize the motor 268a. If the card should stick, the blade 267 will be returned by the spring 270 and the motor 268a will again be energized until the card releases the micro-switch 266 stopping the motor 268a. The cam switch C17 will now be thrown to its alternate position and routes the holding circuit for the relay 345 through the switch 347a of the relay 347 and the switch 266 which has returned to its initial position upon the discharge of the card. If the card has not been ejected properly, the relay 345 will release when cam switch C17 operates, stopping the motor 341 of the programming device and thus the machine cycle.

When the card is ejected, the cam switch C18 is thrown to its alternate position deactivating the ejector solenoid 156 and starts the drive motor 287 of the drive mechanism E. This will begin the cycle to return the table 26 to its initial position with the aperture 114 above the exposure station A. The cam switch C18 breaks the circuit to the processing stations and cam switch C17 is in its alternate position completing the holding circuit to the relay 345 independent of the micro-switch 323. The drive motor 287, upon rotating shaft 285, throws the clamping micro-switch 306 operated by lever 304. The switch 306 breaks the circuit to the processing stations and completes another circuit to the motor 287; now cam switch C18 releases. The micro-switch 320 is thrown upon release of the lock bar 314 and the table 26 is rotated to position the aperture 114 at the exposure station.

During this rotary movement the micro-switch 323 is opened, the micro-switch 257 is returned to its closed position and micro-switch 321 is operated returning it to its initial position as shown on the drawing, FIGURE 18A. Rotation of cam 288 then closes the lock 314 on lug 308 and lowers the table 26 returning micro-switch 320 and micro-switch 306 to their initial positions. Switch 306 cuts the power to the drive motor 287 and closes the circuit to the processing stations. Cam switch C17 is returned to its initial position routing the the holding circuit for relay 345 through the exposure station micro-switch 321. If the micro-switches 321, 320 and 306 have operated properly, cam switches C13, C15 and C16 will return to their initial positions and the machine will continue its cycle to load an unexposed card onto the plate 26 from the magazine M.

As the machine cycle starts its cycle to feed a card from the magazine, cam switch C19 is thrown routing the holding circuit for relay 345 through the switches 332, 334, 336 and 338 to check on the amount of each solution and whether any cards remain in the magazine. If the machine is out of cards or one of the solutions, the associated lamp will light on the panel P and the relay 345 would be de-energized stopping the motor 341 of the programming device.

When the check is satisfactory, cam switch C20 is thrown directing current to the motor 100 of the magazine M and energizes the solenoid 94 to raise the rollers 83 and 84 into engagement with lowermost card in said magazine. As a card is driven out the micro-switch 111 is opened deactivating the solenoid 94 and motor 100 continues to operate feeding the card between the rollers 99. As the card is fed between the vertical plates 117 and 118, it operates the micro-switch 146 returning it to its initial position and stops the motor 100 and energizes the card feed motor 132 raising the feed wheel 140 into position.

The feed wheel 140 drives the card into position in the pocket formed by plates 117, 118, 119 and table 26 and drives the slide bar 147 back in the slot 148 returning micro-switch 152 to its initial position as shown on the drawing. The switch 152 deactivates the motor 132 and energizes the solenoid 160. The solenoid 160 clamps the card in position through the levers 130 and 129. Lever 129 when in clamping position strikes the micro-switch 134 returning it to the initial position shown on the drawing. The card is now in position and cam switches C19, C20 and C2 are returned to their initial position and then; cam switches C1, C2 and C4 are thrown.

When cam switch C4 is thrown, relay 345 is de-energized, motor 341 is stopped and the "ready" lamp 330 is lit. This completes one cycle of the apparatus which produces an aperture card 40 bearing a photographic negative in unitized form in approximately thirty-five seconds after the operator pushed the "print" switch. The operator may now start another "print" cycle, start a "partial-print" cycle or turn off the machine which automatically flushes the nozzles 194 in the developing station B before cutting off.

The "partial-print" cycle of the apparatus allows the operator to photograph both sides of a document onto the film insert before the insert is developed. To effect this the operator places the original on the stage S adjacent one side thereof and places a mask (not shown) on the other side of the stage. The momentary contact "partial-print" switch 328 is now pushed which energizes the solenoid 176 operating the shutter. This effects a latent image of one side of the document on one half of film segment. Now, the operator turns the document over and places the same on the opposite side of the stage S and moves the mask to the side occupied by the document originally. The "print" button switch 326 is now pushed exposing the other half of the film segment and the machine operates through a normal "print" cycle above described.

If the operator wishes to shut off the apparatus, the "off-flush" switch 327 is pushed. The switch 327 de-energizes the power relay 343, turns out the "ready" lamp 330, turns out the "on" lamp 329, and turns off the heater 166. The contacts 343a and 343b are returned to their initial position and since cam switch C1 is closed the relay 349 energized and the lamp 339 is lit. The relay 349 is self holding through its contacts 349a and 349b and through cam switch C2 and will remain energized when the switch 327 is released. The operated contacts 349a and 349b of the relay 349 and the contacts of the power relay 343 also energize the solenoid valves 230 and 232 (only solenoid 230 is shown in FIGURE 18) and energize the motor 341 of the programmer. The valves 230 and 232 allow wash solution to be sprayed through the nozzles 194 of the developer and fix supply lines to flush the same. The deactivated power relay 343 cuts off the power to the rest of the machine so that the actuation of cams 3 through 20 by the motor 341 have no effect during this cycle. The cam switches C1 and C2 are then opened and break the circuit to the lamp 339, solenoids 230 and 232, and relay 349 which stops the motor 341. The apparatus is now off and the "on" switch must be actuated to again place said apparatus in operation.

While the present invention has been described and illustrated, it will be appreciated that various changes may be made in the design and arrangement of the parts of the illustrated embodiment without departing from the spirit and scope of the invention, and that all such changes and modifications are contemplated as may come within the scope of the appended claims.

What is claimed is:

1. An apparatus for the wet processing of a sensitized film mounted as an insert in a water-sensitive aperture card comprising a protective card-supporting table formed with a framed opening corresponding in shape to a said insert but having dimensions somewhat smaller, a frame around said opening on one surface of said table including a recessed area and knife-like edge, a platen mounted for movement toward and away from said framed opening on said one surface of said table for clamping an insert over said knife-like edge to enclose the emulsion side of a said insert in a developing chamber and to protect the card from the processing solutions, and means, including a generally cylindrical body and a plurality of nozzles each connected to a source of processing solution, disposed adjacent the opposite surface of said table to define a developing chamber for processing a said clamped insert.

2. An automated aparatus for exposing and then developing with aqueous solutions a sensitized film insert in a water-sensitive aperture card to produce a visible copy of a document mounted in said card comprising in combination:
   a cord storage and dispensing assembly,
   a generally horizontally oriented card supporting and conveying member including card receiving and positioning means, said member being formed with an opening positioned relative to said card receiving and positioning means to be aligned with the insert in a card when a said card is received on said member, said opening being framed by a knife-like edge, the shape of said edge being the same as a said insert with the dimension of said edge being less than the corresponding dimension of said insert,
   a platen mounted for movement into clamping engagement with a said insert to press the insert against the edge to mask the remainder of the card from said solutions during processing of the insert,
   means defining a processing station and including a plurality of nozzles for directing sprays of aqueous solutions onto a clamped insert to develop the same,
   said platen being retained in clamped position during the entire processing to avoid said aqueous solutions reaching said card.

3. An automated apparatus for exposing and then developing with aqueous solutions a sensitized film insert in a water-sensitive aperture card to produce a visible copy of a document mounted in said card comprising in combination:
   a card storage and dispensing assembly,
   a rotatable, generally horizontally oriented, card supporting and conveying member including card receiving and positioning means, said member being formed with an opening positioned relative to said card receiving and positioning means to be aligned with the insert in a card when a said card is received on said member, said opening being framed by a knife-like edge, the shape of said edge being the same as a said insert with the dimension of said edge being less than the corresponding dimension of said insert,
   a platen mounted for movement into clamping engagement with a said insert to press the insert against the edge to mask the remainder of the card from the processing solutions directed at said opening from beneath said member,
   means defining an exposure station,
   means defining a processing station,
   means defining a drying station,
   each said station being positioned below said member and in spaced relation to each other,
   means for moving said member to enclose the clamped insert in one station and then another to expose, develop and dry a said insert, and
   means for removing the card and developed insert from said member on completion of said processing.

4. An apparatus for exposing and then developing with processing solutions a sensitized film insert in a water-sensitive aperture card to produce a visible photographic copy of a document, etc. mounted in a said card and comprising in combination:
   a stage,
   means for illuminating documents, etc. placed upon said stage,
   means for storing a supply of aperture cards bearing light-sensitive film inserts and for dispensing said cards and inserts,
   means for supporting and conveying a card having an insert including a plate-like member having a size larger than a said card positioned to receive said dispensed cards, said member being formed with at least one opening extending through said member, said at least one opening being framed on one surface of said member by a knife-like edge and said opening having dimensions less than the corresponding dimensions of a said insert,
   an exposure station including a lens and shutter positioned between said stage and said member to impart a latent image of a said document, etc. placed on said stage onto an insert,
   platen means movably mounted on said member for clamping a said insert over said knife-like edge to form a receptacle for the processing solutions and to protect said card from said solutions during processing,
   means for discharging processing solutions into said receptacle to develop the latent image imparted to the insert,
   means for drying a said processed insert,
   means for conveying a card and developed insert from said member, and
   energizable control means for said apparatus for operating said means for storing and for dispensing to dispense a card onto said member, said shutter, said platen means, said means for discharging processing solutions, said means for drying, and said means for conveying a card in a timed sequence upon energization of said control means.

5. An apparatus for exposing and then developing with processing solutions a sensitized film insert in a water-sensitive aperture card to produce a visible photographic copy of a document, etc. mounted in a said card and comprising in combination:
a stage,
means for illuminating documents, etc. placed upon said stage,
means for storing a supply of aperture cards bearing light-sensitive film inserts and for dispensing said cards and inserts,
a plate-like supporting and conveying member having a size larger than a said card positioned to receive said dispensed cards, said member being formed with an opening extending through said member, said opening being framed on one surface of said member by a knife-like edge, said edge having dimensions less than the corresponding dimensions of a said insert,
an exposure station including a lens and shutter positioned between said stage and said member to impart a latent image of a said document, etc. placed on said stage onto an insert,
platen means movably mounted on said member for clamping a said insert over said knife-like edge to form a receptacle for the processing solutions and to protect said card from said solutions during processing,
means for discharging processing solutions into said receptacle to develop the latent image imparted to the insert,
means for removing the free solution from a said insert and drying the same,
means for unclamping said platen during the drying operation,
means for removing a card and developed insert from said member, and
energizable control means for said apparatus for operating said means for storing and dispensing cards to dispense a card onto said member, said shutter, said platen means, said means for discharging processing solutions, said means for removing free solution, said means for unclamping the platen, and said means for removing a card in a timed sequence upon energization of said control means.

6. An apparatus for exposing and then developing with processing solutions a sensitized film insert in a water-sensitive aperture card to produce a visible photographic copy of a document, etc. mounted in a said card and comprising in combination:
a stage,
means for illuminating documents, etc. placed upon said stage,
means for storing a supply of aperture cards bearing light-sensitive film inserts and for dispensing said cards and inserts,
a plate-like, generally horizontally oriented supporting and conveying member having a size larger than a said card positioned to receive said dispensed cards, said member being mounted for rotational movement about a vertical axis and formed with an opening extending through said member, said opening being framed on one surface of said member by a knife-like edge, said edge having dimensions less than the corresponding dimensions of a said insert,
platen means movably mounted on said member for clamping a said insert over said knife-like edge to hold said card and insert on said member and to protect said card during processing,
an exposure station including a lens and shutter positioned below said opening between said stage and said member in one position of said member for imparting a latent image of a said document, etc. placed on said stage onto an insert,
means positioned below said member and said opening for discharging sprays of processing solutions upwardly through said opening in a second position of said member to develop the latent image imparted to the insert,
means including forced air for removing the free solution from a said insert, and drying the insert at a third position of said member,
means for unclamping said platen means during said drying,
means adjacent said third position for removing a card and developed insert from said member, and
control means for rotating and positioning said member at said three positions and for operating said means for storing and dispensing said cards to dispense a card onto said member, said shutter, said platen means, said means for discharging processing solutions, said means for removing free solution, said means for unclamping, and said means for removing a card in a timed sequence upon energization of said control means.

7. An automated apparatus for exposing and then developing with aqueous solutions a sensitized film insert mounted in a water-sensitive aperture card to produce a visible copy of a document on said card comprising in combination:
card storage and dispensing means,
a plate-like card supporting member having a size greater than that of a said card including card receiving and positioning means, said member having an opening extending therethrough which is positioned relative to said card receiving and positioning means to be aligned with the insert in a card when a said card is received on said member, said opening being framed by a knife-like edge on one side of said member, the shape of said edge being the same as a said insert with the dimensions of said edge being less than the corresponding dimensions of said insert,
a platen mounted for movement into clamping engagement with a said insert to press the insert against said knife-like edge to mask the remainder of the card from contact by the developing solutions during processing of the insert, and
means defining a processing station and including means for contacting the exposed portion of the clamped insert with aqueous solutions to develop the same, said platen being retained in clamped position during the entire processing to avoid said aqueous solutions reaching said card.

References Cited by the Examiner

UNITED STATES PATENTS

| | | | |
|---|---|---|---|
| 2,235,844 | 4/1941 | Nelson | 271—41 |
| 2,445,849 | 12/1948 | Yule | 96—44 |
| 2,473,280 | 6/1949 | Dart et al. | 95—14 |
| 2,532,855 | 12/1950 | Rabkin | 95—14 |
| 2,540,124 | 2/1951 | Klein | 95—14 |
| 2,586,286 | 2/1952 | Andreas | 95—75 |
| 2,629,304 | 2/1953 | Tuttle | 95—94 X |
| 2,654,300 | 10/1953 | Baker | 95—75 |
| 2,727,446 | 12/1955 | Tuttle | 95—14 |
| 2,848,326 | 8/1958 | Whitmore | 96—44 |
| 2,928,327 | 3/1960 | Blackmer et al. | 95—75 |
| 2,959,114 | 11/1960 | Brundage | 95—73 |
| 2,961,938 | 11/1960 | Townley | 95—89 |
| 2,998,313 | 8/1961 | Maurer | 96—44 |
| 3,115,079 | 12/1963 | Saffian | 95—12 |

JOHN M. HORAN, Primary Examiner.

NORTON ANSHER, PHILIP MANGAN, Examiners.